(12) United States Patent
Blodt et al.

(10) Patent No.: US 10,422,683 B2
(45) Date of Patent: Sep. 24, 2019

(54) APPARATUS FOR DETERMINING FILL LEVEL OF A FILL SUBSTANCE

(71) Applicant: Endress + Hauser GmbH + Co. KG, Maulburg (DE)

(72) Inventors: Thomas Blodt, Steinen (DE); Winfried Mayer, Buch (DE); Christian Seiler, Auggen (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 299 days.

(21) Appl. No.: 15/503,507

(22) PCT Filed: Jul. 16, 2015

(86) PCT No.: PCT/EP2015/066265
§ 371 (c)(1),
(2) Date: Feb. 13, 2017

(87) PCT Pub. No.: WO2016/023701
PCT Pub. Date: Feb. 18, 2016

(65) Prior Publication Data
US 2017/0241826 A1   Aug. 24, 2017

(30) Foreign Application Priority Data
Aug. 14, 2014   (DE) .................. 10 2014 111 644

(51) Int. Cl.
*G01S 7/03* (2006.01)
*G01F 23/284* (2006.01)
(Continued)

(52) U.S. Cl.
CPC ............ *G01F 23/284* (2013.01); *G01S 7/032* (2013.01); *G01S 7/2806* (2013.01); *G01S 7/2921* (2013.01); *G01S 13/88* (2013.01)

(58) Field of Classification Search
CPC .... G01F 23/284; G01F 23/28; G01F 23/2962; G01F 1/663; G01S 13/88; G01S 13/26;
(Continued)

(56) References Cited

U.S. PATENT DOCUMENTS 3,806,946 A    4/1974  Tiuri et al.
6,373,427 B1*  4/2002  Hohne .................... G01S 7/354
                                                      342/128
(Continued)

FOREIGN PATENT DOCUMENTS

DE    102005057053 A1   5/2007
DE    102010063167 A1   6/2012
(Continued)

OTHER PUBLICATIONS

German Search Report, German Patent Office, Munich, DE, dated May 19, 2015.
(Continued)

*Primary Examiner* — Timothy X Pham
(74) *Attorney, Agent, or Firm* — Bacon & Thomas, PLLC

(57) ABSTRACT

An apparatus for determining the fill level of a fill substance in a container, comprising at least one antenna element. The at least one antenna element has a hollow conductor, wherein there is arranged at a first end region of the hollow conductor a coupling element for the out-coupling of transmission signals and for the in-coupling of received signals, wherein there is arranged at a second end region of the hollow conductor a radiating element directed toward the fill substance, a transmitting/receiving unit having a signal generator for producing the transmission signals. The transmitting/receiving unit determines the fill level of the fill substance in the container based on the travel time of the transmission- and received signals. The connecting line and/or the hollow conductor are/is embodied in such a way
(Continued)

that the transmission signals are transmitted time delayed, so that the distance between the at least one antenna element and the surface of the fill substance is virtually increased and the received signal is isolated in time from disturbances of the transmitting/receiving unit, which arise in the case of producing the transmission signals.

19 Claims, 13 Drawing Sheets

(51) Int. Cl.
    *G01S 7/28* (2006.01)
    *G01S 7/292* (2006.01)
    *G01S 13/88* (2006.01)

(58) Field of Classification Search
    CPC ...... G01S 13/343; G01S 13/4409; G01S 7/03; G01S 7/032; G01S 7/282; G01S 7/35; G01S 7/2921; G01S 7/2806
    USPC .......................................................... 342/124
    See application file for complete search history.

(56) References Cited

U.S. PATENT DOCUMENTS

| | | | | |
|---|---|---|---|---|
| 6,672,155 B2* | 1/2004 | Muller | ................. | G01F 23/284 342/124 |
| 7,265,558 B1* | 9/2007 | Penndal | ................. | G01F 23/284 324/637 |
| 2002/0023489 A1* | 2/2002 | Reimelt | ................. | G01F 23/284 73/290 V |
| 2004/0056667 A1* | 3/2004 | Lutke | .................... | G01F 23/284 324/644 |
| 2009/0158839 A1* | 6/2009 | Spanke | ................. | G01F 23/284 73/290 V |
| 2011/0166805 A1* | 7/2011 | Hammer | ............... | G01F 23/284 702/55 |
| 2011/0193567 A1* | 8/2011 | Klofer | ................... | G01F 23/284 324/642 |
| 2012/0169528 A1* | 7/2012 | Edvardsson | .......... | G01F 23/284 342/124 |
| 2015/0177163 A1* | 6/2015 | Edvardsson | ........... | G01N 22/00 324/642 |
| 2015/0377680 A1* | 12/2015 | Edvardsson | ........... | H01Q 1/225 73/290 V |

FOREIGN PATENT DOCUMENTS

| | | |
|---|---|---|
| DE | 102014111644 A1 | 2/2016 |
| EP | 1643221 B1 | 11/2007 |
| EP | 2151699 A1 | 2/2010 |
| WO | 00/11494 A1 | 3/2000 |

OTHER PUBLICATIONS

International Search Report, EPO, The Netherlands, dated Oct. 9, 2015.

English Translation of the International Preliminary Report on Patentability, WIPO, Geneva, CH, dated Feb. 23, 2017.

* cited by examiner

APPARATUS FOR DETERMINING FILL LEVEL OF A FILL SUBSTANCE

TECHNICAL FIELD

The invention relates to an apparatus for determining the fill level of a fill substance in a container.

BACKGROUND DISCUSSION

Travel-time methods, for example, the pulse radar method and the frequency modulation continuous wave radar method (FMCW radar), utilize the physical law by which travel distance equals the product of travel time and propagation velocity. In the case of fill level measurement, the travel distance corresponds to twice the separation between the antenna and the surface of the fill substance. The received signal, thus the transmission signal reflected on the surface of the fill substance, and its travel time are determined in the case of pulse radar based on the so-called echo function, respectively the digitized envelope curve. The envelope curve represents the amplitudes of the echo signals as a function of the distance "antenna—surface of the fill substance". The fill level is calculated from the difference between the known distance between the antenna and the floor of the container and the distance between the surface of the fill substance and the antenna, as determined by the measurement. The transmitted, respectively received, signals are microwaves, which have a wavelength between 3 and 300 GHz.

German Patent, DE 10 2005 057 053 A1 describes a radar module for out-coupling a reference signal for a fill-level measuring device. The radar module includes a first transmission path for transferring an electromagnetic transmission signal from a source to an antenna. A tap couples a reference signal out from the transmission path. After the tap, the transmission signal passes through a delay and then a circulator, which forwards the transmission signal to the antenna. From the antenna, the transmission signal is then transmitted toward the fill substance, where it is reflected back to the antenna as received signal and fed to the circulator. There, the received signal is passed to a directional coupler, where it is added to the reference pulse.

Such a radar module is disadvantageous, when the fill level is near the antenna. When the transmission signal escapes from the circulator, it undergoes a DK value change. This leads in the vicinity of the antenna to disturbances, which superimpose on the received signal. The received signal cannot be correctly evaluated in this case, so that the measuring of the fill level is corrupted.

SUMMARY OF THE INVENTION

An object of the invention is to provide an apparatus for determining the fill level of a fill substance in a container, wherein the apparatus can determine the fill level even in the vicinity of the antenna.

The object is achieved by the subject matter of the invention. The subject matter of the invention is an apparatus for determining the fill level of a fill substance in a container. The apparatus includes at least one antenna element for sending electromagnetic transmission signals toward the fill substance and for receiving received signals reflected on the surface of the fill substance, wherein the at least one antenna element has a hollow conductor. Arranged at a first end region of the hollow conductor is a coupling element for out-coupling transmission signals and for in-coupling received signals, and arranged at a second end region of the hollow conductor is a radiating element directed toward the fill substance. Furthermore, the apparatus includes a transmitting/receiving unit having a signal generator for producing the transmission signals, and a connecting line, which leads the transmission signals from the transmitting/receiving unit to the coupling element and the received signals from the coupling element to the transmitting/receiving unit, wherein the transmitting/receiving unit determines the fill level of the fill substance in the container based on the travel time of the transmission and received signals.

According to the invention, the connecting line and/or the hollow conductor are/is embodied in such a way that the transmission signals and/or the received signals time are transferred delayed, so that the distance between the at least one antenna element and the surface of the fill substance is virtually increased and the received signal is isolated in time from disturbances of the transmitting/receiving unit, which arise in the case of producing the transmission signals.

In this way, the path, which the transmission-, respectively received, signal must travel, is enlarged, whereby the transmission, respectively received, signal is transmitted time delayed. Since the transmission-, respectively received, signal is time delayed, it arrives at a later point in time and is, therefore, not superimposed by disturbances, which occur in the signal production. Of course, in the case of determining the fill level of the fill substance by means of the travel-time method, the time delay of the transmission-, respectively received, signal must be taken into consideration.

In an advantageous further development, the connecting line includes a chain antenna, so that the transmission signals and/or received signals are transferred via the chain antenna and are time delayed by means of the chain antenna, wherein the chain antenna is preferably operated with frequencies far below the limit frequency of the antenna function. A chain antenna is due to its loops especially suitable for transferring the transmission-, respectively the received, signals over a longer path and thereby to time delay them. The chain antenna must, in such case, be operated far below its limit frequency as antenna, in order that radiation of the chain antenna remains minimal.

In an advantageous embodiment, the hollow conductor extension is embodied siphon like and/or helix like. In this way, the transmission-, respectively received, signal must travel a relatively large distance within a small spatial region and experiences thereby a greater time delay.

In an advantageous variant, the circuit board includes a first circuit board ply and a second circuit board ply, wherein the transmitting/receiving separator is arranged on the first circuit board ply and the coupling element on the second circuit board ply, and wherein there is arranged on the first circuit board ply a first portion of a connecting line, which is connected with a first end of the transmitting/receiving separator, and wherein there is arranged on the second circuit board ply a second portion of the connecting line, which is connected with a first end of the coupling element, and wherein the circuit board has at least one via, which connects a second end of the first portion of the connecting line with a second end of the second portion of the connecting line, so that the transmission signal and/or the received signal must travel through the first and second portions of the connecting line. If the connecting line extends over the first and second sides of a circuit board, the transmission-, respectively received, signal must travel a path twice as long as a connecting line, which extends only over one side of the circuit board. Accordingly, the time delay achieved is twice as long.

In an advantageous embodiment, the connecting line is embodied as a microstrip transmission line on a circuit board, and wherein the circuit board has at least one shielding line, in order to shield transmission-, respectively received, signals radiated from the connecting line. If the connecting line is embodied as a microstrip transmission line on a circuit board, an adjoining shielding line, which is likewise embodied as a microstrip transmission line, is the most effective method for shielding the connecting line.

In an advantageous embodiment, the at least one shielding line has ground potential. In this way, the transmission-, respectively received, signals absorbed by the shielding line can be effectively removed.

In an advantageous form of embodiment, the circuit board includes on a side lying opposite the connecting line a metal layer, which has ground potential, wherein the at least one shielding line is connected with the metal layer by means of at least one via. In this way, the transmission-, respectively received, signals absorbed by the shielding line can be yet more effectively removed.

In an advantageous variant, the circuit board includes a circularly shaped metal ring, which surrounds the connecting line, wherein the metal ring has on an edge region facing the connecting line a sawtooth shaped structure, in order to absorb transmission-, respectively received, signals radiated from the connecting line. The metal ring serves likewise for shielding the connecting line. The sawtooth shaped structure effects that the transmission-, respectively received, signals emitted from the connecting line are absorbed, without being reflected on the metal ring.

In an advantageous variant, the shielding line includes a sawtooth shaped structure on an edge region facing the connecting line, in order to absorb transmission-, respectively received, signals radiated from the connecting line. The sawtooth shaped structure effects that the transmission-, respectively received, signals emitted from the connecting line are absorbed, without being reflected on the metal ring.

In an advantageous further development, the circuit board includes at least one connecting element, which connects the metal ring with the shielding line, in order to reduce axially traveling, transmission-, respectively received, signals. The connecting elements have at least one via to the metal layer, in order that the absorbed transmission-, respectively received, signals are drainable to ground.

In an advantageous variant, a first side of the circuit board has at least partially a first conductive layer and a second side of the circuit board has at least partially a second conductive layer, wherein the circuit board has vias, which electrically connect the first conductive layer with the second conductive layer, and wherein the vias are arranged in such a way that a first row and a second row of vias are present, so that the connecting line is bounded by the first and second sides of the circuit board and by the first and second rows of vias. In this embodiment, the transmission-, respectively received, signal is not transferred by means of a microstrip transmission line on a circuit board, but, instead, between two rows of vias, which go through the circuit board.

In an advantageous form of embodiment, the separation of two neighboring vias in the first and/or second row is less than a fourth, preferably less than an eighth, of the wavelength of the center frequency of the transmission-, respectively received, signals being transferred. In this way, it is assured that the transmission-, respectively received, signal is transferred within the two rows of vias and does not leave the spatial region between the rows of vias.

In an advantageous form of embodiment, the first and second rows of the vias in the circuit board resemble a chain antenna. Since the structure of the chain antenna has proven to be especially effective for time delay, the same structure implemented by means of vias is, likewise, advantageous, in order to achieve a time delay.

In an advantageous further development, the chain antenna resembling, connecting line includes perpendicular and parallel portions, which are perpendicular, respectively parallel, to the transfer direction of the connecting line, and wherein a transition between a perpendicular and a parallel portion is reinforced by means of a supplemental series of vias. At the transitions between the perpendicular and parallel subsections, the transmission-, respectively received, signals exit from the connecting line, an effect which is noticeable as power loss of the transmission-, respectively received, signals being transferred. A second series of vias minimizes this loss at these positions.

In an advantageous variant, at least two, preferably three, circuit boards are arranged neighboring one another, wherein the two, preferably three, circuit boards are connected pairwise with one another, so that the transmission-, respectively received, signals pass through all circuit boards once. Neighboring circuit boards are especially well suited for delaying the transmission-, respectively received, signals within a small spatial region.

In an advantageous embodiment, the at least two, preferably three, circuit boards are stacked on top of one another, wherein the at least two, preferably three, circuit boards have at least one shared via, which goes through all circuit boards. Shared vias, which penetrate through all circuit board plies, can be implemented in less time and cost effectively, since each circuit board does not have to be individually processed.

In an advantageous further development, a supply line and/or drain line of the connecting line have/has a diameter discontinuity, in order to produce reflected portions of the transmission-, respectively received, signals. Reflections enlarge the path, which the transmission-, respectively received, signal must travel, and, in this way, contribute to the time delay.

In an advantageous form of embodiment, a supply line and/or drain line of the connecting line includes a discontinuity in the form of a connecting line neighboring the supply line and/or the drain line. If the supply line or drain line of a first connecting line borders an adjoining, is second connecting line, the second connecting line can be used as a discontinuity of the first connecting line and vice versa, in order to reflect the transmission-, respectively received, signals multiple times and thereby time delay them.

In an advantageous embodiment, the connecting line at an opening to a hollow conductor of an antenna element includes a widening to the diameter of the hollow conductor, in order that the impedance-jump at the transition between the connecting line and the hollow conductor is as small as possible and the geometric fit is as continuous as possible. The widening achieves matching of the impedance and the geometry at the transition between the connecting line and the hollow conductor.

In an advantageous form of embodiment, the circuit board in the region of the widening is conically tapered toward the hollow conductor. The conicity contributes to matching the impedance at the transition between the connecting line and the hollow conductor.

BRIEF DESCRIPTION OF THE DRAWINGS

The invention will now be explained in greater detail based on the appended drawing, the figures of which show as follows:

FIG. 12b is a bottom view of the circuit board of FIG. 12a;

DETAILED DISCUSSION IN CONJUNCTION WITH THE DRAWINGS

Figure 1:
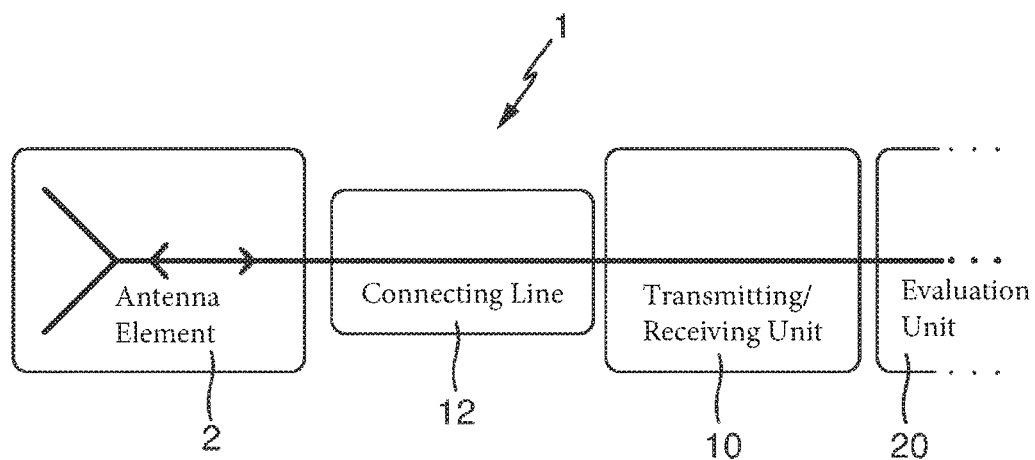
FIG. 1 is a schematic view of a fill-level measuring device for determining the fill level of a fill substance in a container according to the state of the art.

FIG. 1 shows a fill-level measuring device 1 for determining the fill level of a fill substance (not shown) in a container (not shown) according to the state of the art. The fill-level measuring device 1 includes an antenna element 2 for transmitting electromagnetic transmission signals toward the fill substance and for receiving received signals reflected on the surface of the fill substance. The antenna element 2 is connected by means of a connecting line 12 with a transmitting/receiving unit 10. The connecting line 12 leads the transmission signals from the transmitting/receiving unit 10 to the antenna element 2 and the received signals from the antenna element 2 to the transmitting/receiving unit 10. The transmitting/receiving unit 10 serves for producing the transmission signals and receiving the received signals. Connected to the transmitting/receiving unit 10 is an evaluation unit 20. The evaluation unit 20 registers the point in time, at which a transmission signal is sent and the point in time at which a received signal is received. From the time difference between the sending of the transmission signal and the receiving of the received signal, the fill level of the fill substance in the container is determined.

Figure 2:
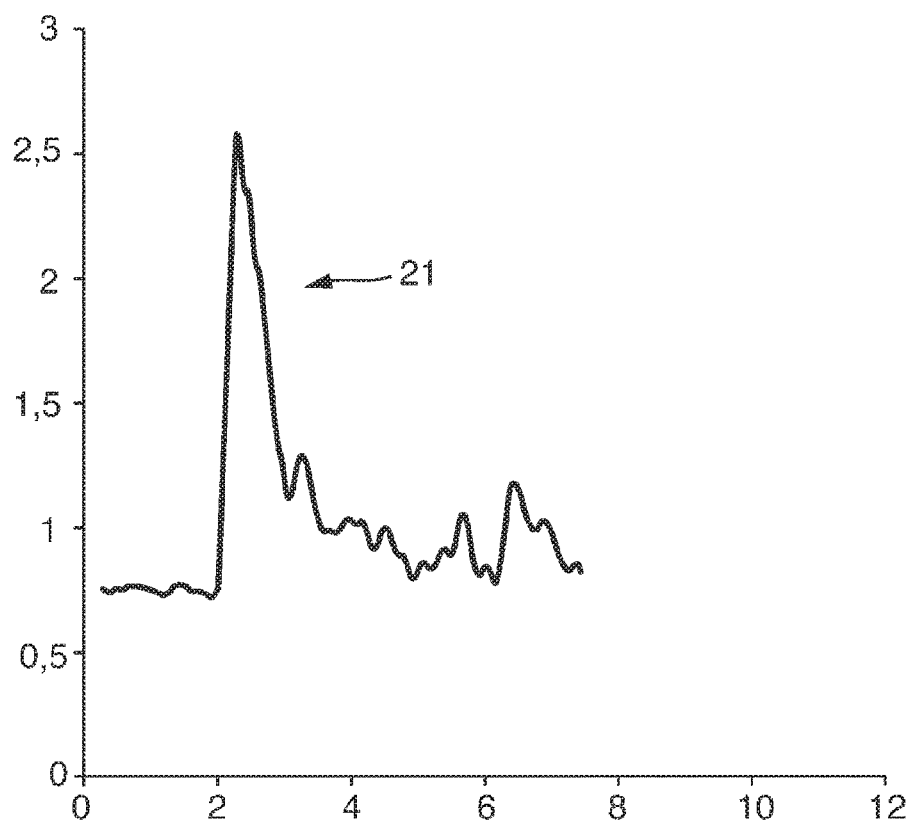
FIG. 2 is an echo curve, in the case of which the transmission signal is superimposed as a disturbance on the received signal.

FIG. 2 shows a typical echo curve 21, which is recorded and displayed by the evaluation unit (not shown). In such case, the fill level of the fill substance (not shown) is located in the container relatively near to, in the vicinity of, the antenna element. The transmission signal occurs as a disturbance in the received signal. As a result, the received signal is covered by the transmission signal, whereby the travel time of the received signal and, thus, the fill level are not determinable.

Figure 3:
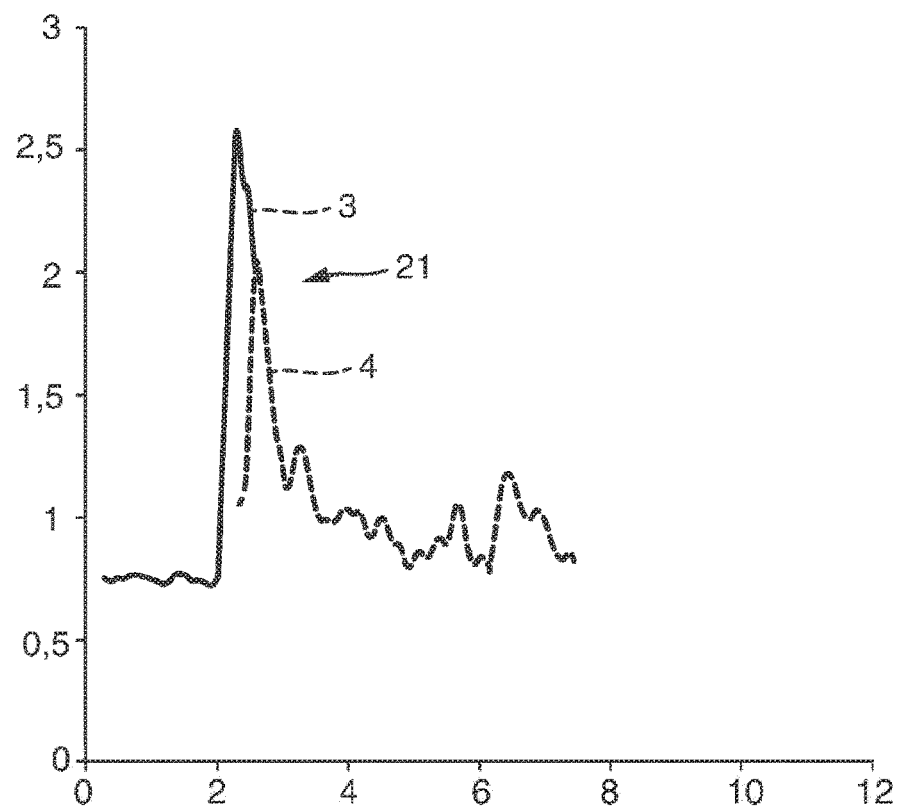
FIG. 3 is an echo curve corresponding to FIG. 2, in the case of which the transmission signal and the received signal are separately shown.

FIG. 3 shows an echo curve 21, in the case of which the transmission signal 3 (solid line) and the received signal 4 (dashed line) are distinguished in the echo curve 21.

Figure 4:
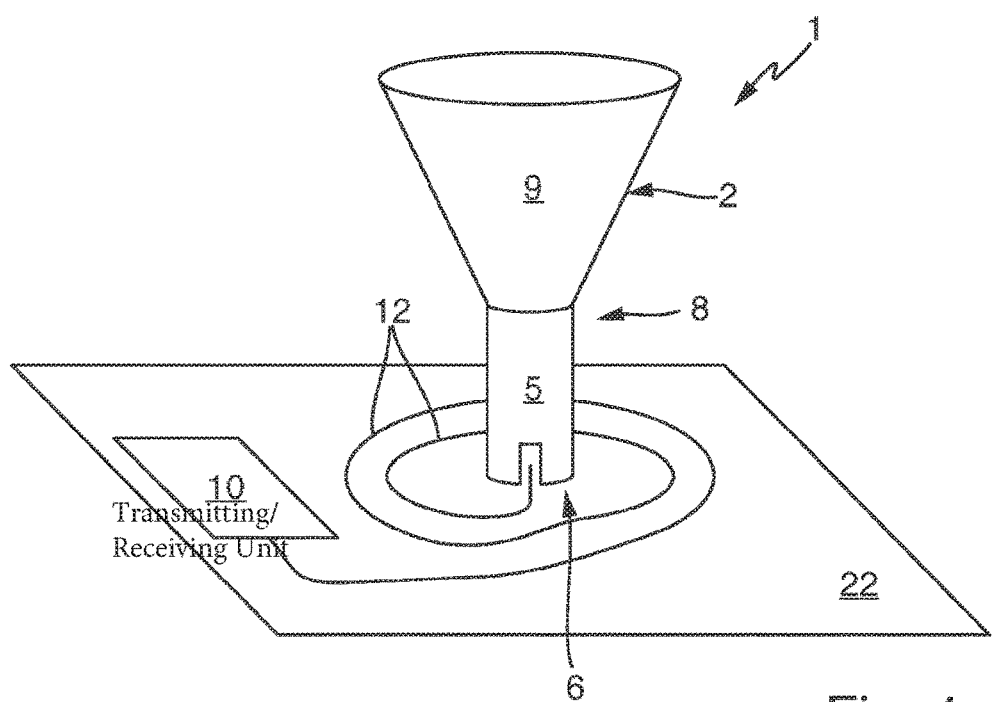
FIG. 4 is a schematic view of an apparatus of the invention, in the case of which the connecting line is lengthened.

FIG. 4 shows a schematic view of an apparatus 1 of the invention, in the case of which the connecting line 12 is lengthened. The apparatus 1 includes an antenna element 2 with a hollow conductor 5 and a radiating element 9. The radiating element 9 is arranged on an end region of the hollow conductor 5. In this way, the transmission signals of the hollow conductor 5 are radiated by the radiating element 9 toward the fill substance (not shown).

At an end region of the hollow conductor 5 lying opposite the radiating element 9, the hollow conductor 5 is arranged on a circuit board 22. A coupling element (not shown) of the antenna element 2 is connected with the spiral shaped connecting line 12, wherein the spiral shaped connecting line 12 is arranged on a surface of the circuit board 22. The spiral shaped connecting line 12 winds around the end region of the hollow conductor 5 arranged on the circuit board 22. Arranged at an edge region of the surface of the circuit board 22 is a transmitting/receiving unit 10. The spiral shaped connecting line 12 makes two loops before connecting to the transmitting/receiving unit 10. The length of the spiral shaped connecting line 12 is selected in such a way that the transmission signal 3 and the received signal 4 are displayable isolated in the echo curve 21.

Besides lengthening the connecting line 12, also the hollow conductor 5 can be lengthened, in order to time delay the transmission signal. A corresponding lengthening of the hollow conductor 5 is shown in FIG. 5.

Figure 5:
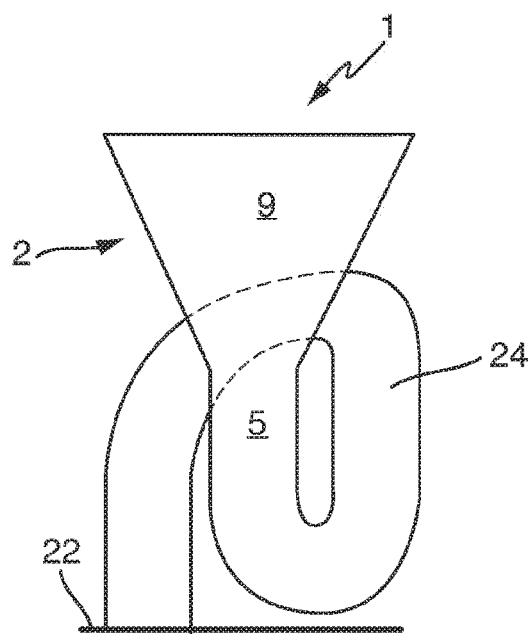
FIG. 5 is a schematic view of an apparatus of the invention, in the case of which the hollow conductor includes an hollow conductor extension.

FIG. 5 shows a schematic view of an additional example of an embodiment of the apparatus 1 of the invention. The hollow conductor 5 has a hollow conductor extension 24. This likewise delays the transmission signal.

Figure 6:
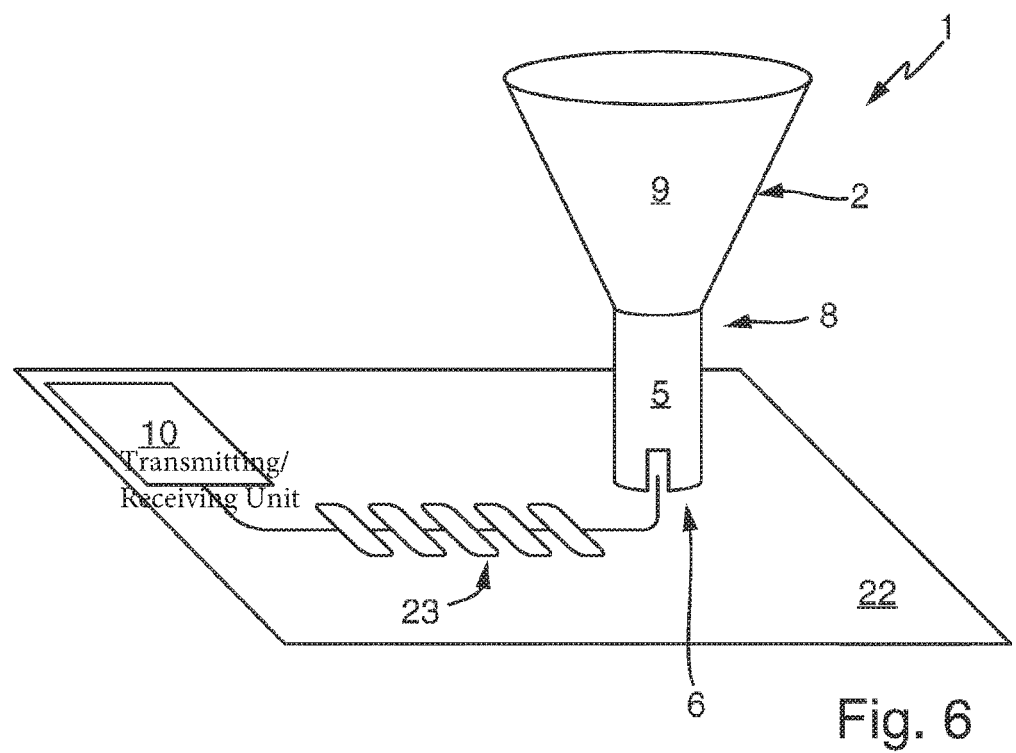
FIG. 6 is a schematic view of an apparatus of the invention, in the case of which the connecting line includes a chain antenna.

FIG. 6 shows a schematic view of an additional variant of the apparatus 1 of the invention of FIG. 4. The connecting line 12 includes a chain antenna 23, which is arranged on or in the circuit board 22. The chain antenna 23 serves for time delay of the transmission signal (not shown). The transmission signal has only frequencies, which lie far below the limit frequency of the chain antenna 23. In this way, the chain antenna 23 does not radiate transmission-, respectively received, signals. The transmission signal is transferred and time delayed approximately loss-freely by the chain antenna 23. The construction of a chain antenna is described at length, for example, in U.S. Pat. No. 3,806,946 and is not explained here further.

The transmission-, respectively received, signals are transferred mainly via the connecting line 12. A lesser part of the transmission-, respectively received, signals is, however, transferred via the atmosphere surrounding the connecting line 12. For this reason, an effective dielectric constant results, which is obtained by integration of the field distribution over the dielectric constant of the connecting line 12 and the dielectric constant of the surrounding air. In this case, the effective dielectric constant amounts to $\varepsilon_{eff}$=2.38. The effective dielectric constant is less than the dielectric constant, which would result in case of transfer of the transmission-, respectively received, signals only via connecting line 12. For this reason, any transfer, which does not happen via the connecting line 12, must be suppressed.

From the effective dielectric constant there results for the propagation velocity $v_{eff}$ of the transmission-, respectively received, signals on a connecting line 12, with $c_0$ standing for the vacuum speed of light:

$$v_{eff} = \frac{c_0}{\sqrt{\varepsilon_{eff}}} = 194.5*10^6 \text{ m/s}.$$

Advantageously, the propagation velocity is as low as possible, since thereby in the case of spatially equally long structure, respectively equal circuit board length, a greater delay can be achieved. If the connecting line 12 is applied in a potting material (not shown), there results an additional delay, depending on dimensioning, for instance, by the factor 3.5:

$$\frac{v_{eff}}{3.5} = \frac{c_0}{3.5*\sqrt{\varepsilon_{eff}}} = 55.6*10^6 \text{ m/s}.$$

Figure 7:
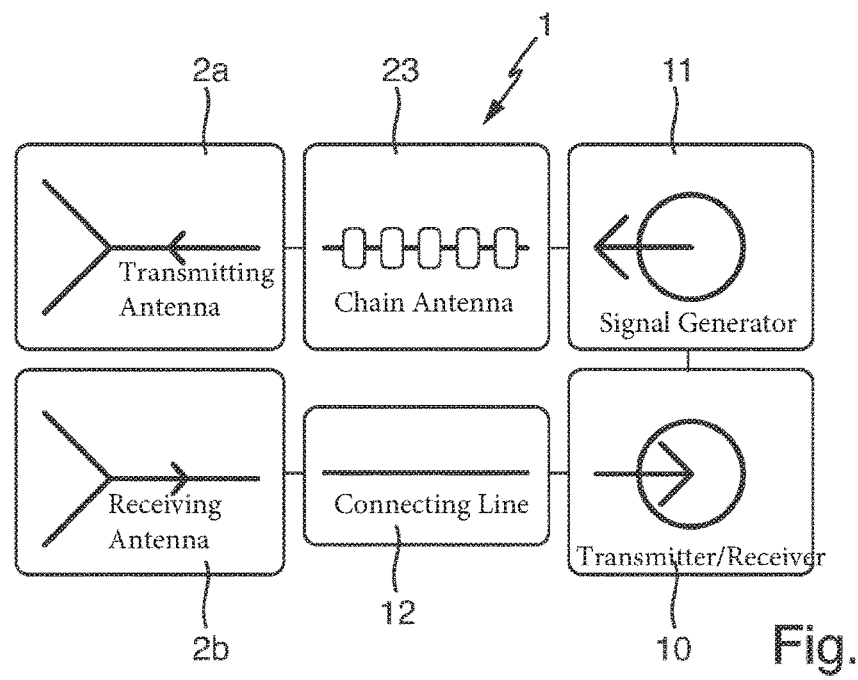
FIG. 7 is a circuit of an apparatus of the invention with a transmitting antenna and a receiving antenna.

FIG. 7 shows a schematic view of a circuit of an apparatus 1 of the invention. A signal generator 11 generates a transmission signal. The transmission signal is transferred by means of a chain antenna 23 to a transmitting antenna 2a, whereby it is time delayed. The transmitting antenna 2a radiates the transmission signal in the direction of the surface of the fill substance (not shown) in the container (not shown). The fill substance reflects the transmission signal in the form of a received signal, which is received by a receiving antenna 2b and transferred by means of a connecting line 12 to a transmitting/receiving unit 10. Furthermore, the transmission signal jumps in the form of a disturbance directly from the signal generator 11 to the transmitting/receiving unit 10, whereby the transmission signal is superimposed on the received signal.

Figure 8:
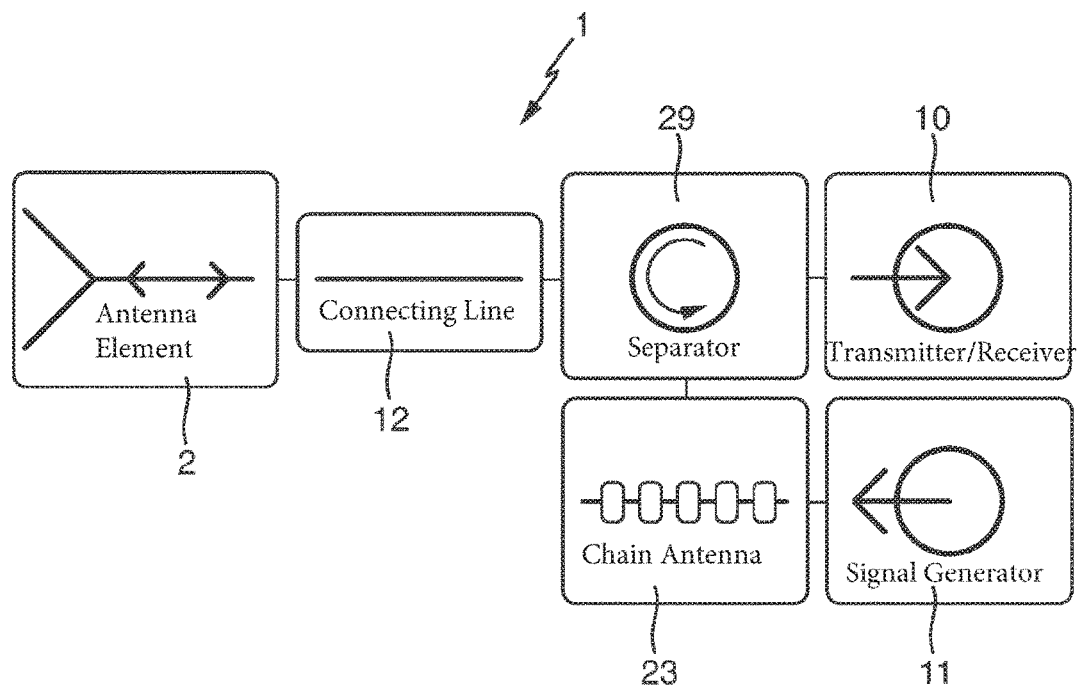
FIG. 8 is a circuit of an apparatus of the invention with a single antenna element.

FIG. 8 shows a schematic view of a circuit of an additional apparatus 1 of the invention, in the case of which the transmission signal and the received signal are transmitted and received via a single antenna element 2. The signal generator 11 generates a transmission signal, which is transferred via a chain antenna 23 to a transmitting/receiving separator 29. The transmitting/receiving separator 29 sends the transmission signal via a connecting line 12 to the antenna element 2. The antenna element 2 transmits the transmission signal toward the fill substance (not shown) and receives the received signal, which was reflected on the surface of the fill substance. Then, the received signal is transferred via the connecting line 12 to the transmitting/receiving separator 29. The transmitting/receiving separator 29 directs the received signal to a receiving unit 10.

Figure 9:
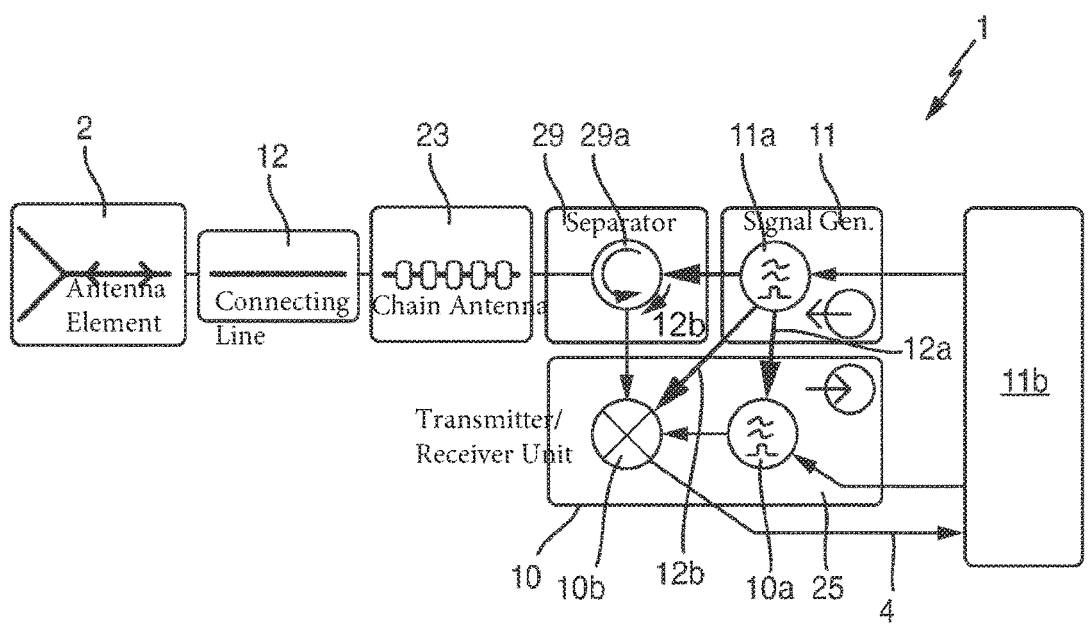
FIG. 9 is a circuit of an apparatus of the invention with a signal evaluating unit for triggering the transmission signal.

FIG. 9 shows a schematic view of a circuit of a further development of the apparatus 1 of FIG. 8, in the case of which both the transmission signal and also the received signal are transferred via a chain antenna 23. A signal generator 11 is composed of a transmission pulse oscillator 11a, which is triggered by an operating and signal evaluating unit 11b. Signal generator 11 produces a transmission signal, which is transferred to a transmitting/receiving separator 29. The transmitting/receiving separator 29 is composed of a loss free circulator 29a or a combination of coupler (not shown) and matched termination (not shown). The transmitting/receiving separator 29 transfers the transmission signal to a chain antenna 23, which time delays the transmission signal and transfers the transmission signal via a connecting line 12 to an antenna unit 2. The antenna unit 2 transmits the transmission signal toward the fill substance (not shown) and receives the received signal reflected on a surface of the fill substance. The received signal is transferred from the antenna unit 2 via the connecting line 12 and the chain antenna 23 to the transmitting/receiving separator 29. The transmitting/receiving separator 29 transfers the received signal to a receiving unit 10, which is composed of a reception pulse oscillator 10a and a high-frequency mixer 10b. The reception pulse oscillator 10a is likewise triggered by the signal evaluating unit 11b, which processes the low frequency received signal 4 of the high-frequency mixer 10b according to the pulse correlation principle.

The power of the transmission pulse oscillator 11a is essentially higher (order of magnitude about 100 dB) than the power of the signals received in the high-frequency mixer 10b. As a result, there is a disturbance of the high-frequency mixer 10b by signals of the transmission pulse oscillator 11a within the apparatus 1 or within the circuit board (not shown). The disturbances are transferred via the direct path 12a, by radiation into the output stage (not shown) of the reception pulse oscillator 10a and in the backwards direction 12b via the transmitting/receiving separator 29 to the high-frequency mixer 10b.

The chain antenna 23 in the connecting line 12 delays the received signal, which reaches the high-frequency mixer 10b working as correlator, in sufficient measure that the received signal cannot coincide with the transmission signal superimposed as a disturbance of a switched-on transmission high-frequency pulse oscillator 11a and the disturbances in the near region are reduced.

Figure 10:
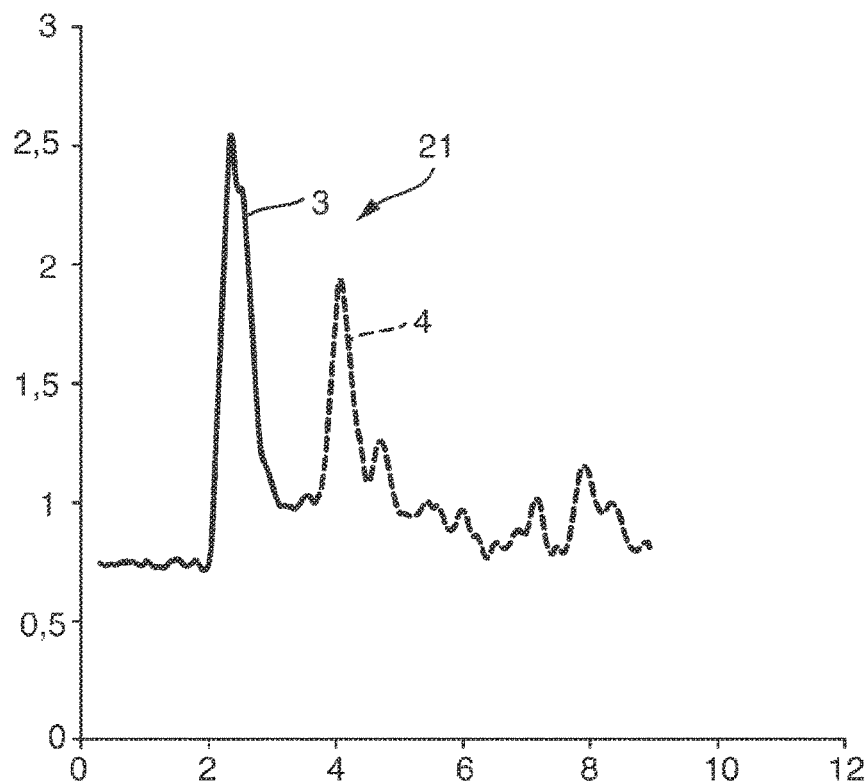
FIG. 10 is an echo curve, in the case of which the transmission signal and the received signal are isolated in time.

FIG. 10 shows an echo curve 21 of FIG. 3, in the case of which the transmission signal 3 and the received signal 4 are time isolated. The isolation results according to the invention from a time delay of the transmission signal 3, so that the received signal 4 is received time delayed relative to the transmission signal 3. Thus, the distance between the antenna element (not shown) and the surface of the fill substance (not shown) is virtually increased. In this way, the is transmission signal 3 and the received signal 4 are separated in time in the echo curve 21, so that the two are displayable isolated from one another.

Figure 11:
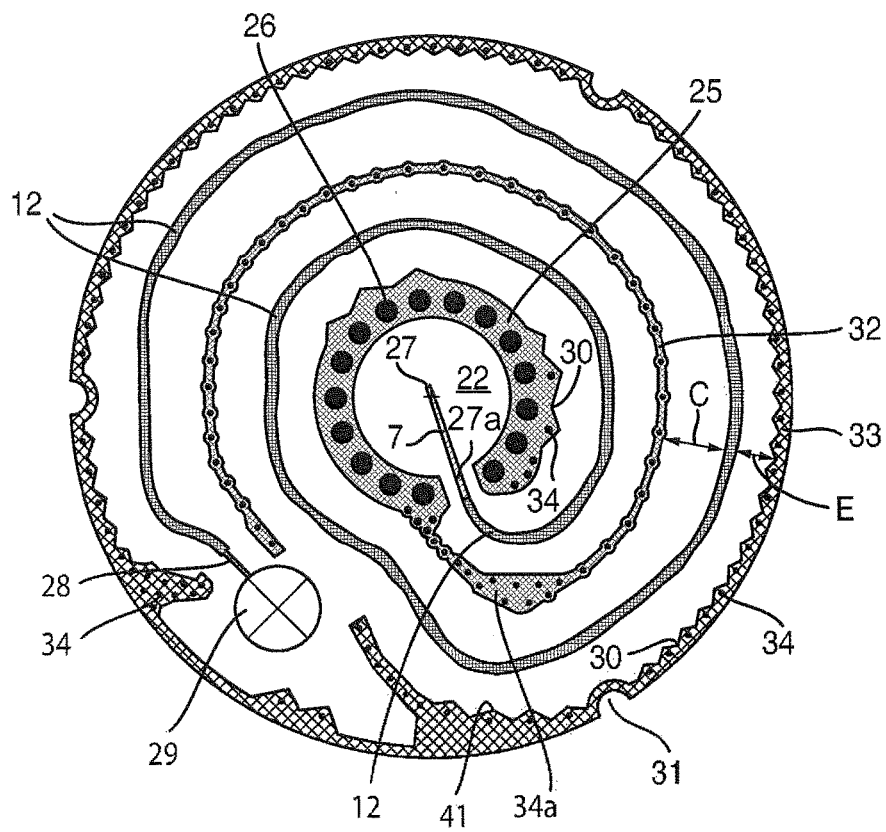
FIG. 11 is a circuit board with a lengthened connecting line.

FIG. 11 shows a circuit board 22 of the invention with a lengthened connecting line 12 for use in an apparatus 1 of FIG. 4.

The end region of the hollow conductor (see FIG. 4) lying opposite the radiating element is connected electrically with a metal surface 25 of the circuit board 22. The metal surface 25 includes large vias 26, which connect the metal surface 25 with a metal layer (not shown), which is arranged on a side of the circuit board 22 lying opposite the metal surface 25 and has ground potential.

The metal surface 25 is sickle shaped, wherein a coupling element 7 is arranged within the sickle shaped metal surface 25. The coupling element 7 serves for out-coupling the transmission signals into the hollow conductor and for in-coupling the received signals of the hollow conductor.

Coupling element 7 is elongated and minimally (about 8%) longer than a fourth of the wavelength of the transmission-, respectively received, signals to be coupled, wherein a first end 27 of the coupling element 7 is arranged in a central region of the sickle shaped metal surface 25 and a second end 27a of the coupling element 7 is arranged in an opening region of the sickle shaped metal surface 25. The first end 27 of the coupling element 7 is embodied narrower than the second end 27a of the coupling element 7, so that the coupling element 7 broadens conically from the central region of the metal surface 25 toward the opening region of the metal surface 25. The conical shape means an increasing line impedance along the coupling element 7, which, in turn, is means that the transmission-, respectively received, signals are in-coupled into the hollow conductor 5 with a lower impedance. The first end 27 of the coupling element 7 is embodied bluntly, since a blunt end can be etched more precisely and, thus, is more reproducible than a pointed end.

The second end 27a of the coupling element 7 is connected to a spiral shaped connecting line 12, wherein the connecting line 12 is embodied as a strip line with a length of about 200 mm. Connecting line 12 extends spirally on the circuit board 22, wherein the metal surface 25 lies in the center of the spiral shaped connecting line 12. Extending parallel to connecting line 12 is a shielding line 32, which is likewise spiral shaped and connected at a first end with the sickle shaped metal surface 25. At a second end, the shielding line 32 is connected to a circularly shaped metal ring 33, which surrounds both the connecting line 12 as well as also the shielding line 32.

If the transmission-, respectively received, signals are transferred in the connecting line 12 with a velocity of $v_{eff}=2*10^6$ m/s, a time delay of about 1 ns results. If these would be free transmission-, respectively received, signals, they would have to travel a distance of about 300 mm, in order to have the same time delay.

By passing twice through the connecting line 12 (transmission- and reception path), there results a time delay of the transmission signal of about 2 ns in the echo curve.

At an end of the connecting line 12 lying opposite the coupling element 7, the connecting line 12 is connected by means of a matching structure 28 with a transmitting/receiving separator 29. Connected to the transmitting/receiving separator 29 can be other HF assemblies (not shown), wherein the additional HF assemblies can also be arranged on the oppositely lying metal layer.

Both the shielding line 32 as well as also the metal ring 33 have small vias 34 to the metal layer. Furthermore, the metal surface 25 and the metal ring 33 have on their edge regions neighboring the connecting line 12, in each case, sawtooth shaped structures 30, wherein teeth 41 of the sawtooth shaped structure point in the direction of the connecting line 12. The teeth 41 absorb transmission-, respectively received, signals radiated from the connecting line 12 and transfer them by means of the low inductance, small vias 34 to the metal layer (not shown), wherein the metal layer has ground potential. The small vias 34 are not arranged electrically optimally in the rear corners of the sawtooth shaped structure 30, but, instead, are area savingly placed within the teeth 41 of the sawtooth shaped structure 30.

Indentations 31 are provided for securement of the circuit board 22. Since no vias are arranged in the region of the indentations 31, a lateral metallizing of the circuit board 22 in this region is advantageous.

If the connecting line 12 has at some locations a smaller radius of curvature than at other locations, then the shielding line 32 must have at regions 34a neighboring these locations of smaller radius an increased number of small vias 34.

With increasing operating frequency and decreasing radius of curvature, the highest field density in the connecting line 12 shifts to the inside of the curvature. For this reason, a radial first separation C between a part of the shielding line 32 and a part of the connecting line 12 external relative to this part of the shielding line 32 is greater than a second separation E between a portion of the connecting line 12 and a part of the metal ring 33 external to this portion of the connecting line 12.

The shielding line 32 is embodied as area savingly as possible. Due to the large vias 26, the transition between the metal surface 25 and the metal layer is of relatively low impedance, in order to avoid so-called ground loops in the HF-region.

Preferably, the connecting line 12 has a relatively large, effective dielectric constant. This results from the fact that the time delay rises with the dielectric constant. The dielectric constant of the connecting line 12 can, however, not be selected arbitrarily large, since, in the case of too large dielectric constant, the coupling element 7 shields the transmission-, respectively received, signals to be coupled.

In this example of an embodiment, the circuit board 22 leads, with a diameter of only 50 mm and a circuit board material with a relative dielectric constant of 3.00, to a time delay of about 2 ns.

If the connecting line 12 of the arrangement of the invention is integrated in an HF-circuit, the higher dielectric constant of the connecting line 12 means a clearly higher time delay between the transmission- and received signal.

Figure 12A:
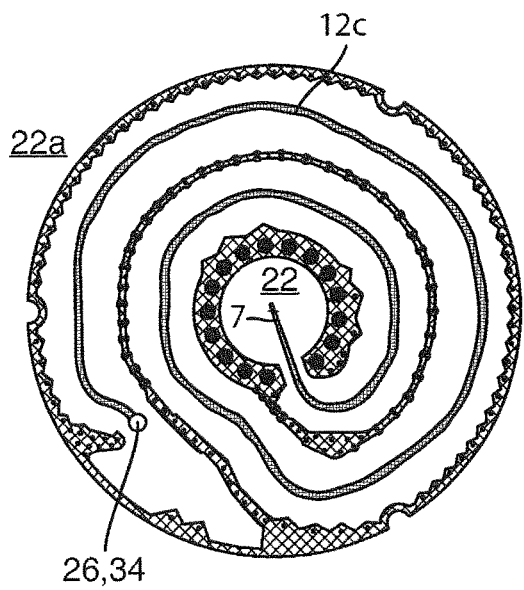
FIG. 12a is a plan view onto a circuit board, in the case of which the circuit board is populated on both sides.
Figure 12B:
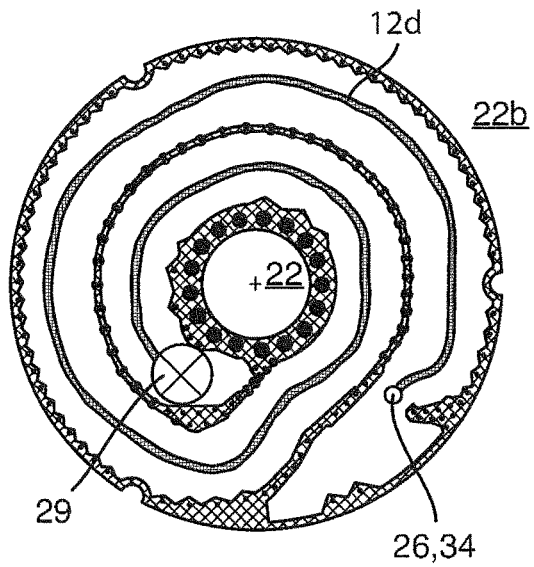

FIG. 12a and FIG. 12b show another embodiment of a circuit board 22. This circuit board 22 is populated on both sides. The circuit board 22 has two circuit board plies 22a, 22b. The circuit board 22 includes in the interior a metal layer (not shown), which is utilized jointly by both circuit board plies 22a, 22b.

A coupling element 7 of the antenna element (not shown) is located on a first circuit board ply 22a, and a transmitting/receiving separator 29 is located on a second circuit board ply 22b of the circuit board 22. Arranged on the first circuit board ply 22a is a first portion 12c of a connecting line 12, which is connected with a first end of the coupling element 7. Arranged on the second circuit board ply 22b is a second portion 12d of the connecting line 12, which is connected with a first end of the transmitting/receiving separator 29. Circuit board 22 includes a small or large via 26, 34, which connects a second end of the first portion 12c of the connecting line 12 with a second end of the second portion 12d of the connecting line 12, so that the transmission signal and/or the received signal must travel through the first and second portions 12c, 12d of the connecting line 12.

Alternatively, the circuit board 22 can have three or more circuit board plies. However, in each case, at least one ground layer must be arranged between two neighboring circuit board plies.

Figure 13:
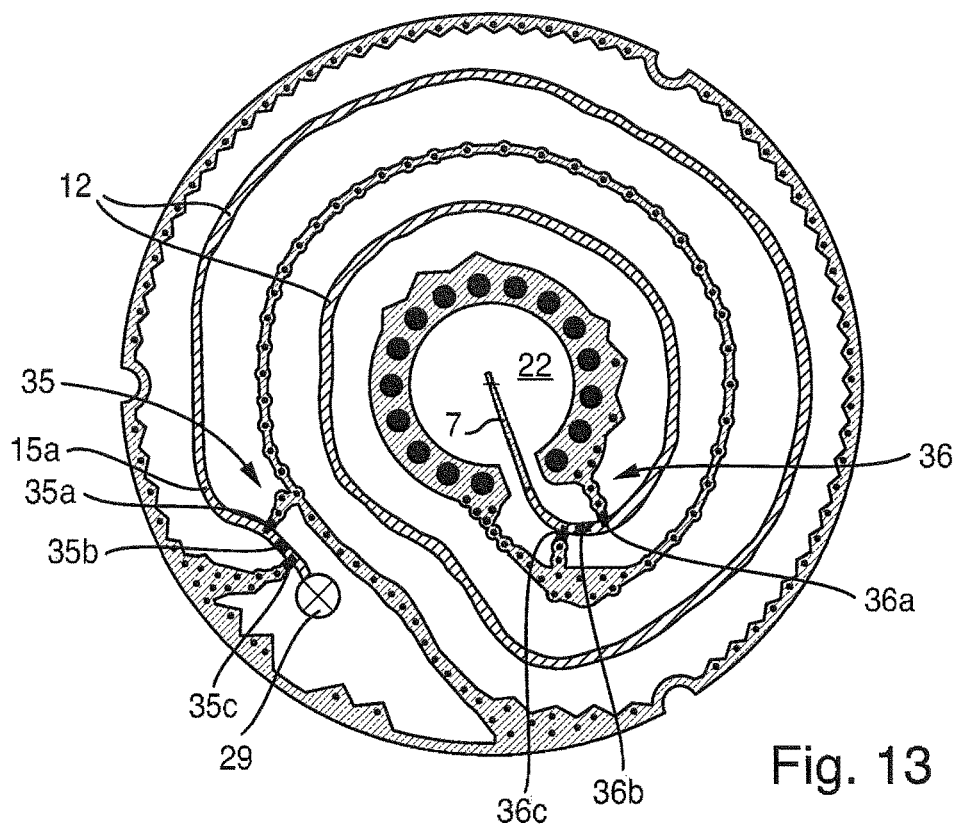
FIG. 13 is a plan view onto a circuit board of FIG. 11, in the case of which the connecting line has two PI units for matching.

FIG. 13 shows a plan view onto a circuit board 22 of FIG. 11, in the case of which the matching structure (see FIG. 11) is replaced by a first PI unit 35. The first PI unit 35 includes a π-shaped arrangement of three components 35a, 35b and 35c, which are embodied as resistances/reactances. A second PI unit 36 is arranged between the coupling element 7 and the connecting line 12, wherein the second PI unit 36 likewise includes three components 36a, 36b, and 36c.

The first PI unit 35 serves for matching the transmitting/receiving separator 29 to an integrated HF radar chip (not shown). The dimensioning of the components 35a, 35b, 35c can occur after the layout of the circuit board 22.

The antenna element (not shown) can be matched to the hollow conductor or to the coupling element 7 by means of the second PI unit 36, so that a connecting together of the hollow conductor and the coupling element 7 minimizes each reflection between the hollow conductor and the coupling element 7 in the considered frequency range. The first PI unit 35 and the second PI unit 36 are populated with SMD components, such as capacitors, coils and resistors.

The first PI unit 35 and the second PI unit 36 can have equal or different impedances. In this way, for example, another impedance can be selected for the hollow conductor (not shown)—for example, in the case of a filling of the radiating element (not shown) with plastic for increasing the pressure resistance or condensate resistance—or the connecting line 12 can be selected favorably compared with the transmitting/receiving separator 29.

The matching of each impedance is possible by populating the first PI unit 35 and the second PI unit 36 with coils (not shown) and/or capacitors (not shown). Suitable matching of the antenna element (not shown) to the coupling element 7 can, for example, exclude unfavorable wave modes, especially in the case of antennas, which are arranged in neighboring containers with access to a main container. A PI unit 35, 36 can also be combined with a matching structure based on microstrip conductor technology.

Figure 14:
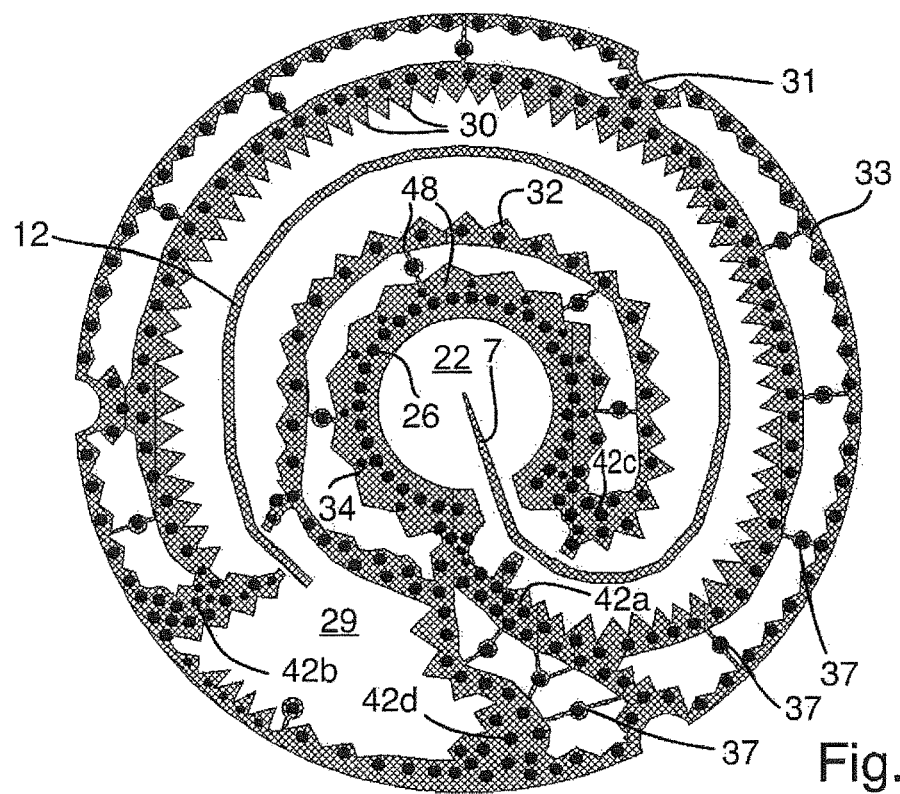
FIG. 14 is a plan view onto a circuit board for showing a further development of the circuit board of FIG. 13.

FIG. 14 shows a plan view onto a circuit board 22 showing a further development of the circuit board of FIG. 13. Circuit board 22 has a diameter of about 50 mm and a structure for an operating frequency of 26 GHz, so that the time delay of the connecting line 12 corresponds to a connecting line with a length of about 600 mm.

The cross coupling of the transmission-, respectively received, signals, which take the shortest path between the transmitting/receiving separator 29 and the coupling element 7, should due to the measuring dynamic range be attenuated by more than 100 dB.

In the following, only differences relative to FIG. 13 are described. In this embodiment of the circuit board 22, the connecting line 12 is embodied circularly with an opening. A shielding line 32 is arranged in such a way on the circuit board 22 that a first part is arranged within the circularly shaped connecting line 12 and forms an inner circle relative to the circularly shaped connecting line 12. A second part of the shielding line 32 is arranged outside of the circularly shaped connecting line 12 and forms an outer circle relative to the circularly shaped connecting line 12. The first part and the second part of the shielding line 32 are connected electrically with one another over the opening of the connecting line 12. Both the first internally situated part of the shielding line 32 as well as also the second external part of the shielding line 32 have a sawtooth shaped structure 30 on one of edge regions facing the connecting line 12, in order to absorb transmission-, respectively received, signals radiated from the connecting line 12. The transmission-, respectively received, signals absorbed by the sawtooth shaped structure 30 are drained via the large vias 26 to the metal layer (not shown). Ideally, the large vias 26 are arranged between two teeth 41. For space reasons, the large vias 26 are arranged within the teeth 41.

Connecting line 12 radiates more strongly outwardly than inwardly. For this reason, the sawtooth shaped structure 30 of the second portion of the shielding line 32 has larger teeth 41 than the teeth 41 of the sawtooth shaped structure 30 of the first portion of the shielding line 32.

The metal ring 33 has large vias 26 also in the regions neighboring indentations 31.

Furthermore, connecting elements 37 are provided, which connect the shielding line 32 with the metal ring 33. The connecting elements 37 each have a large via 26. The connecting elements 37 are directed radially outwardly and avoid, that the transmission-, respectively received, signals absorbed by the sawtooth shaped structure 30 propagate between the shielding line 32 and the metal ring 33 circularly through the circuit board 22. Furthermore, the connecting elements 37 have a length, which is less than the minimum of a fourth of the wavelength of the operating frequency in air, vacuum and the material of the circuit board. The metal surface includes besides large vias 26 also small vias 34, whereby ground loops of the hollow conductor 5 via the large vias 26 are prevented.

Since the residual cross coupling in a first intermediate region 42a between the coupling element 7 and the transmitting/receiving separator 29 is critical, two rows of the large vias 26 are provided in the first region 42a, wherein the rows of the large vias 26 are offset relative to one another.

Other critical regions 42b, 42c, 42d are also provided with at least two rows of large vias 26 offset relative to one another and supplementally with small vias 34.

A paste (not shown), which is applied gel-like on the circuit board 22, serves for absorption of the high-frequency transmission-, respectively received, signals. The paste is a black paste, which hardens at room temperature and remains with adhesive bond on the circuit board 22.

Such a high-frequency wave, absorbing paste can, however, also be applied on the regions between the two signal deflection fronts, which are produced by the first and second parts of the shielding line 32, and can lead to an additional absorption of transmission-, respectively received, signals, which are radiated from the circuit board 22 and reflected back via a housing.

Figure 15:
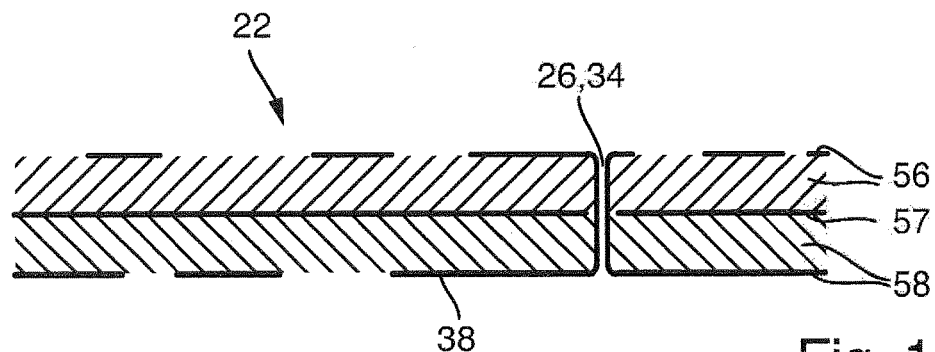
FIG. 15 is a side view of a circuit board with an enlarged view of a via.

FIG. 15 shows a small, respectively large, via 26, 34, which, for example, connect the metal surface 25 with the metal layer (see FIG. 11). In this way, it is possible to accommodate an additional delay path on the metal layer.

Moreover, the delay is dependent on the dielectric constant and the impedance of the utilized circuit board material and the operating frequency.

The relationship results:

$$\Delta = \sqrt{\frac{D_{DK}}{F_F}},$$

wherein $\Delta$ is the relative travel time change, $D_{DK}$ a change of the dielectricity of the circuit board 22, and $F_F$ a frequency dependent factor. In the case of an operating frequency of 25 GHz and a line impedance of 50 ohm, $F_F$ equals 0.751.

If the circuit board 22 has a coupling element (not shown) or an antenna element, a lower dielectric constant of the circuit board 22 is advantageous.

Figure 16:
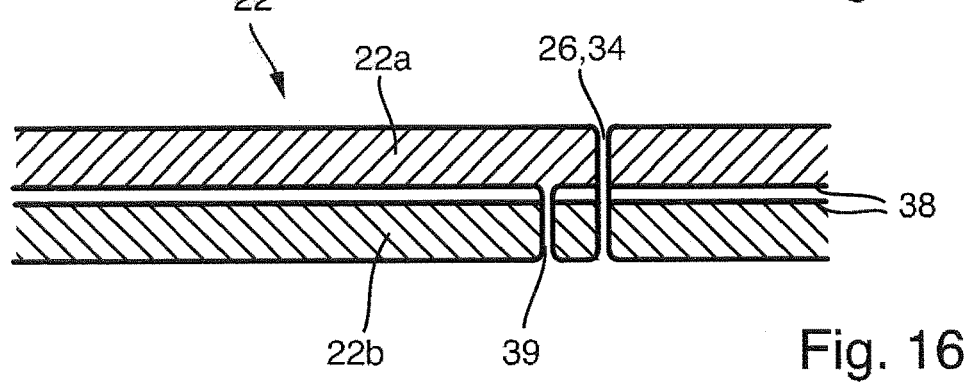
FIG. 16 is a side view of two circuit boards with a shared intermediate contacting.

FIG. 16 shows a further example of an embodiment, in the case of which a first circuit board ply 22a and a second circuit board ply 22b are stacked on top of one another, wherein the first and second circuit boards 22a, 22b utilize a metal layer 38 together or separately. If the metal layer 38 is separately utilized, at least one intermediary contacting 39 is necessary, which connects the first and second circuit board plies 22a, 22b, wherein the lateral separation D between the intermediary contacting 39 and the small, respectively large, via 26, 34 must not exceed a value $D_{max}$ of $$D_{max} = 0.25 * \sqrt{\max(DK_1, DK_2)} * \lambda_0; \text{ with}$$

$$\lambda_0 = \frac{c_0}{f} = \text{free space wavelength,}$$

wherein $\max(DK_1, DK_2)$ is the maximum of the relative dielectric constants of the first and second circuit board plies 22a, 22b.

The teeth 41 of the first portion of the shielding line 32 are embodied shorter than the teeth 41 of the second portion of the shielding line 32, since the transmission-, respectively received, signals of the connecting line 12 have due to the curvature a higher field density on the inside—and accordingly greater signal fractions can radiate—than on the outside, so that a larger separation is needed between the teeth 41 of the first portion of the shielding line 32 and the connecting line 12.

Figure 17:
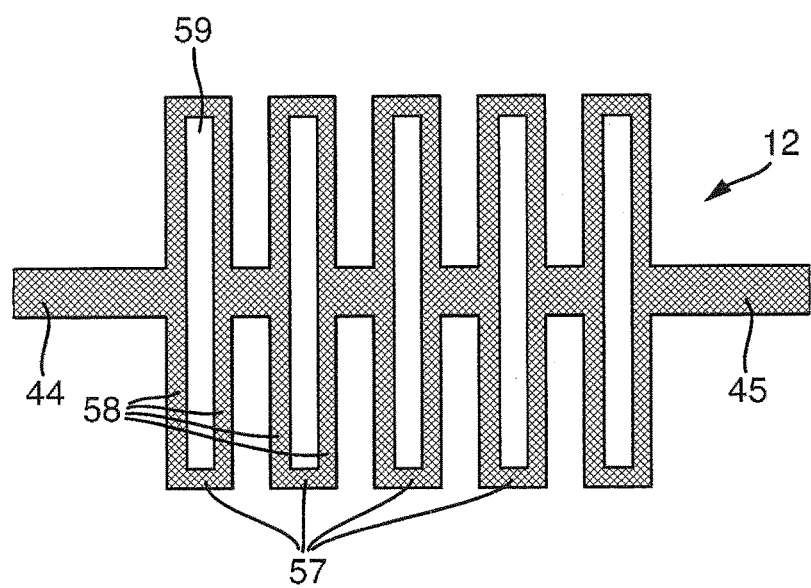
FIG. 17 is a plan view onto a connecting line, which is embodied as vias on a circuit board, wherein the structure of the vias resembles a chain antenna.

FIG. 17 shows an embodiment of the connecting line 12, which has a structure (hatched region) resembling a chain antenna (see FIG. 6). Connecting line 12 is, however, not implemented by means of a wire or a stripline on the circuit board (not shown), but, instead, by means of vias, which go through the circuit board. The vias form a densely spaced row at an edge region of the connecting line 12 in the circuit board, so that the transmission-, respectively received, signals are led within the connecting line 12. Connecting line 12 is symmetrically embodied, so that an input 44 and an output 45 of the connecting line can be interchanged, without changing the transmission-, respectively received, signals transferred through the connecting line 12.

Since the connecting line 12 on the circuit board has the structure of a chain antenna, the transmission-, respectively received, signals are transferred partially through the circuit board and partially through the surrounding atmosphere or the adjoining material. As a result, the adjoining material (not shown) cannot be a potting material (not shown), since the dielectric constant of such material influences the time delay as well as the reflection suppression characteristics of the circuit board. The dielectric constant of the potting material cannot be assumed to be reproducible and constant at high frequencies. Even small fluctuations of the dielectric constant would lead to large deviations of the line impedance of the connecting line 12.

Potting materials have a relative dielectric constant of about 2 . . . 5. The temperature and humidity of the surrounding air influences during casting the moisture entrapped in the potting material. Since water inclusions have a relative dielectric constant of 60 . . . 150 (dependent on the temperature), even small amounts influence the dielectric constant. Dependent on the potting material, a subsequent formation of silicone oil or especially water uptake by open pored foams is possible.

The larger the water accumulation in the potting material, the larger the fraction of transmission-, respectively received, signals, which take the shorter path through the potting material and not the long path through the connecting line 12. As a result, potting materials are to be avoided in the environment of connecting line 12.

In order to avoid a field distribution in the vicinity of the circuit board, the portions 57 of the connecting line parallel to the transfer direction must be selected as short as possible. The portions 58 of the connecting line perpendicular to the transfer direction must be lengthened correspondingly, in order to arrive at the same time delay. In this way, the area 59 enclosed by two parallel and two perpendicular subsections 57, 58 is lessened. Especially advantageous and area saving is the limiting case, in which the area 59 and the parallel portions 57 are no longer present.

Figure 18:
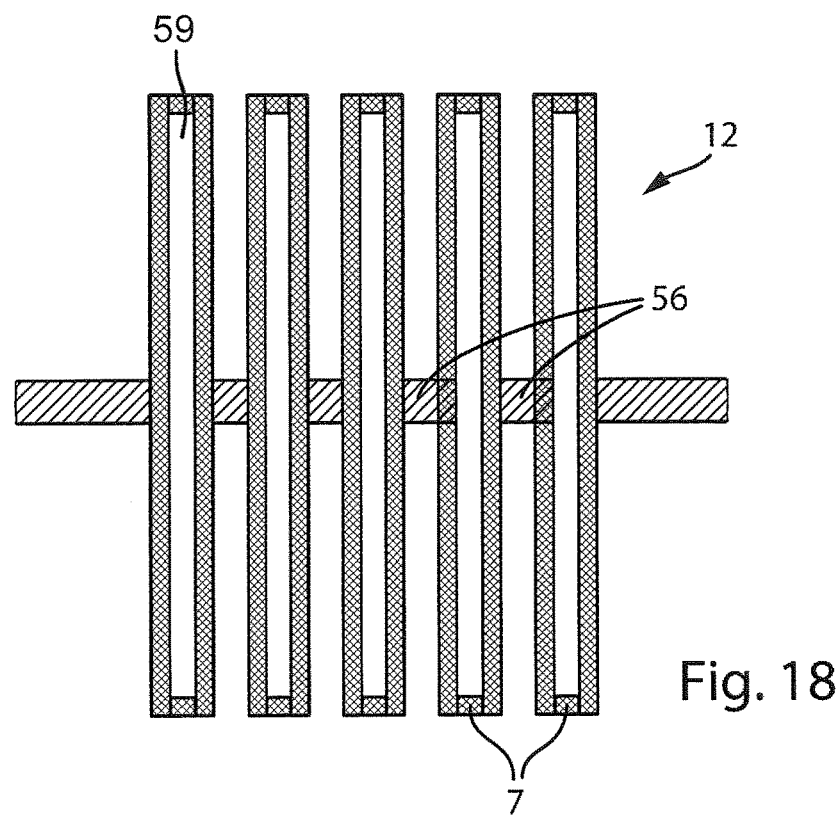
FIG. 18 is a plan view onto a connecting line of FIG. 17, wherein the parallel portions of the connecting line are shortened and the perpendicular portions lengthened.

FIG. 18 shows an embodiment, in the case of which the parallel portions of the connecting line 12 are embodied shorter and the perpendicular portions 58 of the connecting line 12 longer than on corresponding portions in the connecting line 22 of FIG. 17. In this way, the enclosed area 59 is lessened.

Figure 19:
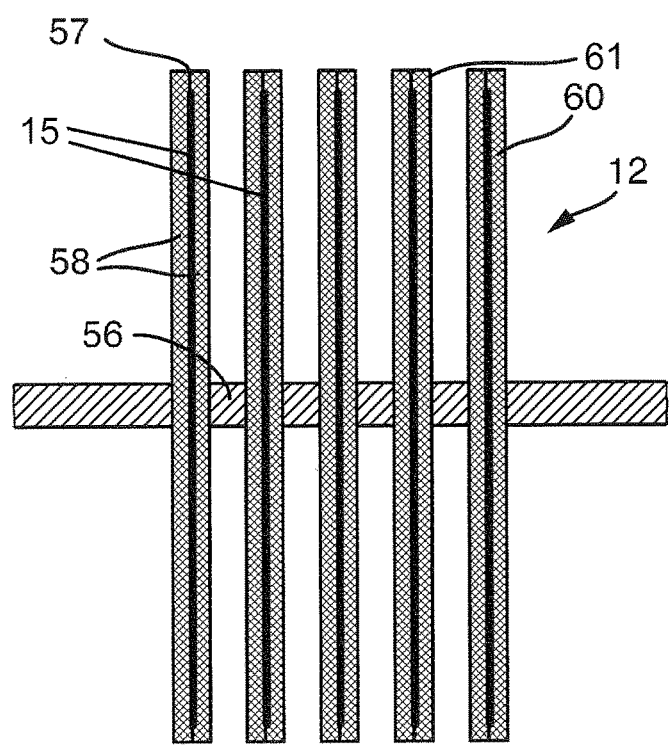
FIG. 19 is a plan view onto a connecting line of FIG. 18, wherein the length of the parallel portions of the connecting line is minimal.

FIG. 19 shows an embodiment of a connecting line 12, in the case of which the parallel portions 57 are minimum and, thus, also the area 59.

Because of this, separating walls 15 are necessary, which avoid that transmission-, respectively received, signals take the shortcut from one perpendicular portion 58 to the adjoining perpendicular portion 58 of the same chain link, without traveling the longer path via the parallel portion 57, which connects the perpendicular portions 58 at the end of two perpendicular portions 58. The separating walls 15 are preferably embodied of vias (not shown) of shortest possible distance from one another. In such case, the impedances of the input and the output and the joints 56 must be equal. The parallel portions 57 and the perpendicular portions 58 of the connecting line 12 have, in each case, an impedance that is twice the size of the impedance of the input 44 and the impedance of the output 45 and the impedance of the joints 56.

Figures 20A, 20B, 20C:
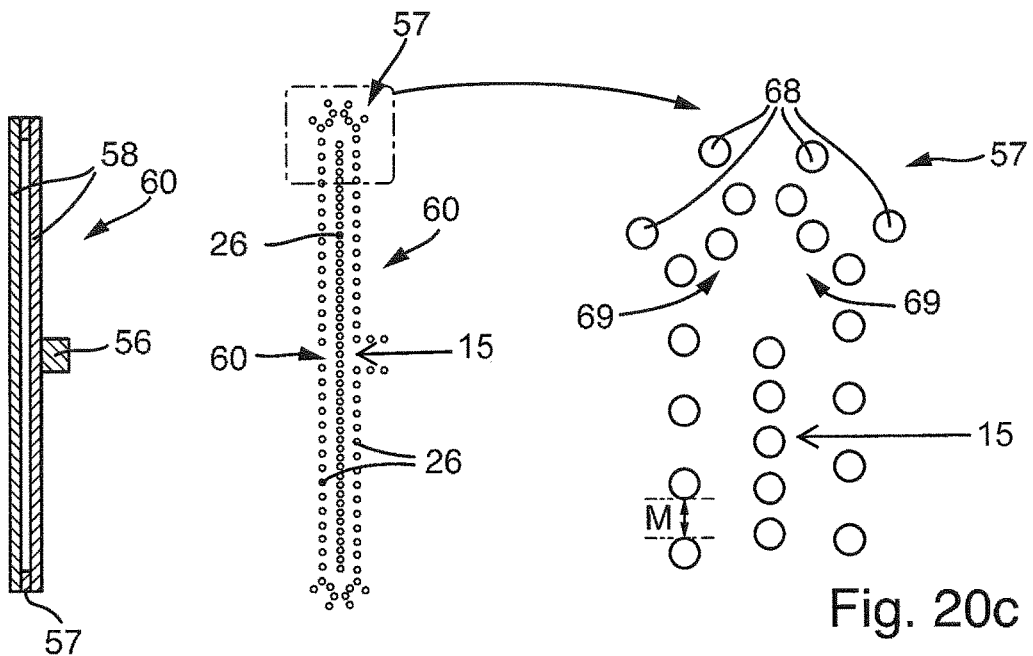
FIG. 20a is a plan view onto a chain link of the connecting line resembling a chain antenna.
FIG. 20b is a plan view onto a chain link of the connecting line resembling a chain antenna, wherein vias are visible.
FIG. 20c is an enlarged plan view onto a parallel portion of a connecting line of FIG. 2b.

FIG. 20*a* shows a chain link 60 of the chain antenna resembling, connecting line of FIG. 19. The chain link 60 is implemented by means of vias (not shown) on a circuit board (not shown).

FIG. 20*b* shows a first chain link 60 of the chain antenna resembling, connecting line 12, which is implemented by means of large vias 26. The joint 56 is implemented by a row of very closely adjoining, large vias 26. At the outer limits of the chain link 61, the separations of the large vias 26 are greater. The minimum separation M between two large vias 26 must not exceed a fourth of the transferred wavelength, should, however, be less than an eighth of the wavelength.

FIG. 20*c* shows an enlarged parallel portion 57. The parallel portions 57 of the connecting line 12 serve as a boundary surface for transmission-, respectively received, signals. In order to avoid radiation at the parallel subsections 57, very small distances between the large vias 26 are necessary. In order to counteract radiation (and, associated therewith, disturbances of other assemblies, undesired cross coupling effects at adjoining line corners and line losses), a supplemental series 68 of vias is positioned at the transitions 69 between the perpendicular and the parallel subsections 57, 58.

Furthermore, the vias 26 are emplaced in such a manner that the transitions 69 are suitably mitered. The mitering method is known from the state of the art and is not discussed further here. Suitable means in this connection that a desirably small part of the wave energy is reflected and the rest transferred.

Figure 21:
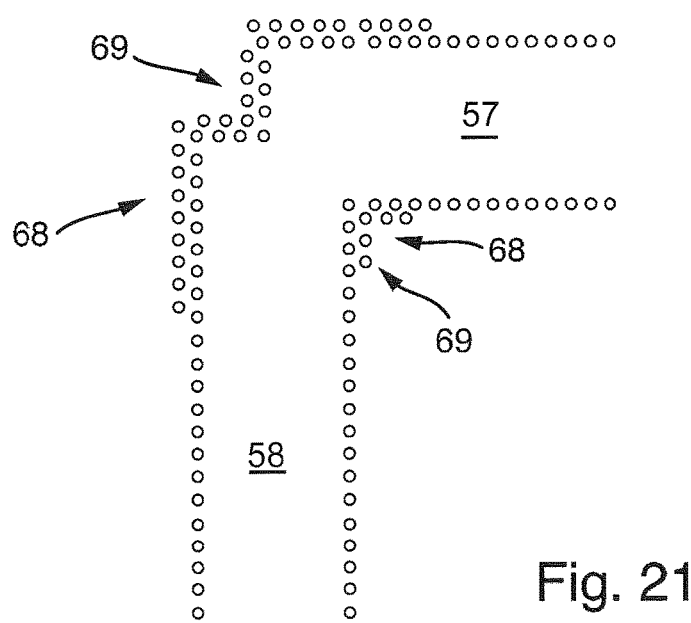
FIG. 21 is an enlarged plan view onto a transition between a parallel portion and a perpendicular portion of a connecting line.

FIG. 21 shows an enlargement of a transition 69 between a perpendicular and a parallel portion 57, 58 of FIG. 20*c*.

At the transitions 69, the field density is greater than at the perpendicular and parallel subsections 57, 58. The field density depends on the sizes of the parameters of the circuit board, such as, for example, thickness, DK value, or operating frequency and the dimensioning of the vias.

For this reason, it is advantageous to arrange a supplemental series 68 of vias at the transitions 69 between parallel and perpendicular subsections 57, 58, in order that the fraction of reflected transmission-, respectively received, signals rises at the transitions 69 and the fraction of transmission-, respectively received, signals, which escape from the connecting line 12 at the transitions 69, sinks.

Figure 22:
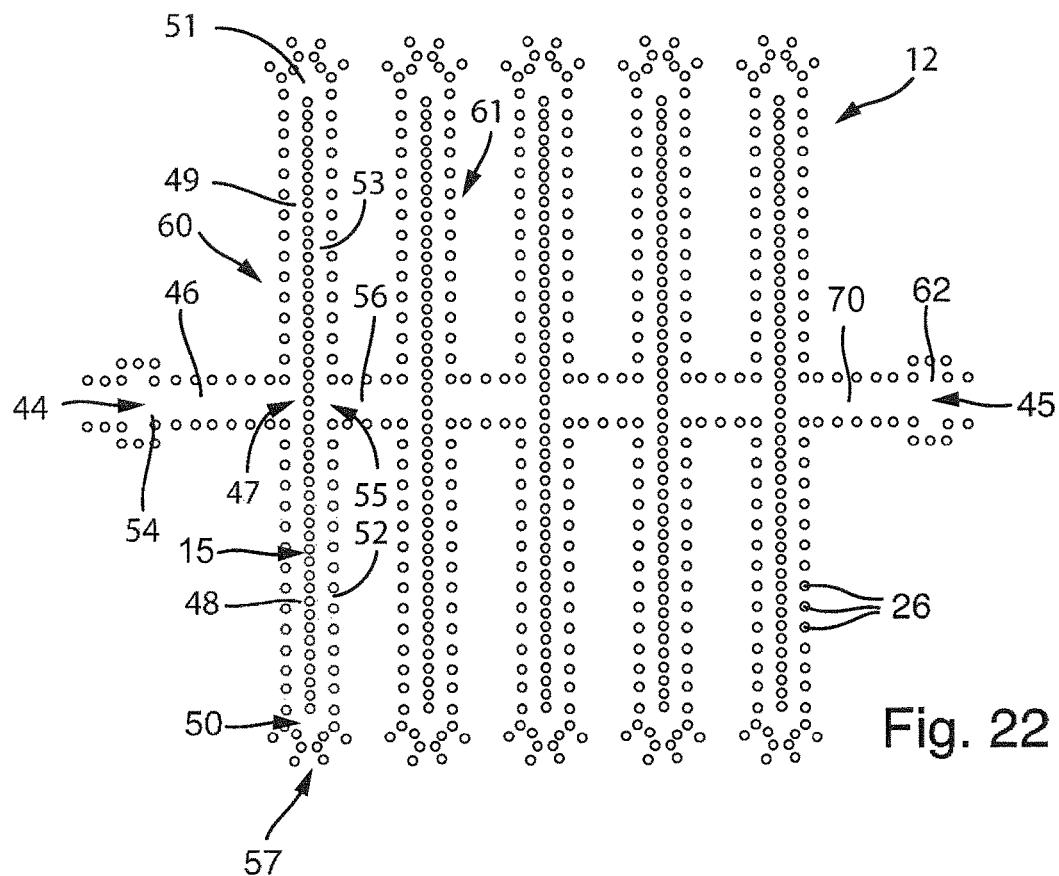
FIG. 22 is a plan view onto an arrangement of the total connecting line of vias on the circuit board.

FIG. 22 shows an arrangement of the total connecting line 12 on a circuit board (not shown). The transfer of the transmission-, respectively received, signals via the connecting line 12 occurs in the following way. The transmission-, respectively received, signals are in-coupled via the input 44 of the connecting line 12 and led via a supply line 46 to a first branch location 47 at a separating wall 15 and divided uniformly to first and second branches 48, 49. The impedances of the first and second branches 48, 49 are so selected that no reflections take place. At an end 50 of the first branch and at an end 51 of the second branch, a fraction of the transmission-, respectively received, signals come, in each case, to a parallel portion 57, and, corresponding to the impedances of the first and second branches 48, 49, a small part of the transmission-, respectively received, signals is reflected and travels back to the first branch location 47.

The remaining large part of the transmission-, respectively received, signals travels in a first passageway 52 and a second passageway 53 along the separating wall 15, wherein the first and second passageways 52, 53 extend parallel to the first, respectively second, branches 48, 49. A third part of the transmission-, respectively received, signals travels back to the first branch location 47 and then into the supply line 46.

Located at the input 44 of the connecting line 12 is a first discontinuity 54 of the diameter of the supply line 46, wherein the distance from the first discontinuity 54 to the first branch location 47 corresponds to a fourth of the wavelength of the transmission-, respectively received, signals, in order to reflect all reflections. A part of the transmission-, respectively received, signals is reflected at the first and second ends 50, 51 via the first and second passageways 52, 53 to a second branch location 55 and from there transferred via a joint 56 to a second chain link 61 of the chain antenna resembling, connecting line 12, where the transfer and reflections continue as in the first chain link 60.

Due to the reflections, such as, for example, at the ends 50, 51 of the first, respectively second, branch 48, 49 or at the first, respectively second, branch location 47, 55, these elements are utilized multiple times, whereby the travel time of the transmission-, respectively received, signals is increased and, therewith, also the time delay.

By superpositioning of the transmission-, respectively received, signals due to the reflections and a suitable dimensioning with reference to wavelength and travel time, a structure of the connecting line 12 can be implemented, which, as a whole, has a large delay and low reflections within a frequency band or two frequency bands, wherein the two frequency bands must not be neighbored. As a result of multiple reflections, a broadening of transmission- and received pulses (not shown) can be present. If the quality of the connecting line 12 is selected to be less than the signal quality, such effects are not noticed.

The structure of the connecting line 12 of the invention is completely integrated in the circuit board. The relative dielectric constant amounts typically to $\varepsilon_r=3.0$. If a vacuum- or air filled, hollow conductor is used as connecting line 12, the propagation velocity results due to the field distribution in the selected dimensions, for instance, to $$v_{HL}=c_0*0.93=279*10^6 m/s$$

If the connecting line 12 is filled with a material, $$v_{HL} = \frac{c_0 * 0.93}{\sqrt{\varepsilon_{\mathit{eff}}}} = 161 * 10^6 \text{ m/s}$$

and with a structure of the invention analogous to FIG. 5 (factor of 3.5)

$$v_{INV} = \frac{c_0 * 0.93}{3.5 * \sqrt{\varepsilon_{\mathit{eff}}}} = 46 * 10^6 \text{ m/s}$$

thus providing an additional time delay of 21% compared with the embodiment of FIG. 5. Corresponding to the structural length, also the structural width is reduced proportionally, whereby an area reduction of 38% can be achieved. Furthermore, the lengthened group travel time arises not from the action of two field fractions of different velocities (circuit board/air), but, instead, from interferences. The effective dielectric constant mentioned above in this section represents, in such case, a simplification for a simpler calculation; more exactly considered, $\varepsilon_{\mathit{eff}}$ is frequency dependent, for the limiting case of f=0 Hz (direct voltage), $\varepsilon_{\mathit{eff}} \approx 1$.

Figure 23:
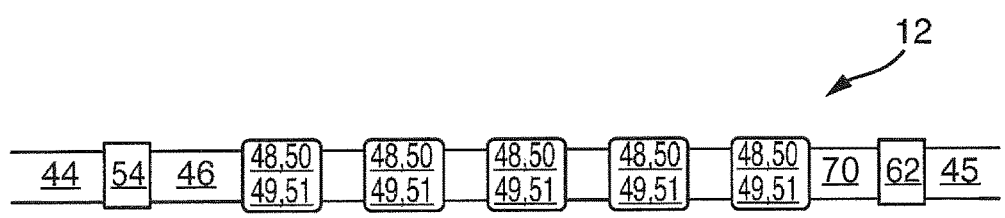
FIG. 23 is a schematic side view of a circuit board, respectively a connecting line, of FIG. 22.

FIG. 23 shows a sketch of a side view of a connecting line 12 of FIG. 22. The first and second branches 48, 49 and their first and second ends 50, 51 and the joints 56 are shown only by their reference characters. Due to the symmetric construction, the input 44 and the output 45 can be interchanged.

Figure 24A:
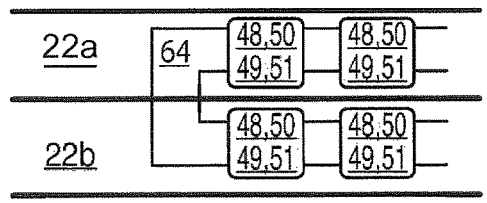
FIG. 24a is a schematic side view of two circuit board plies, which are connected by means of a reversal structure.

FIG. 24a shows a side view of two circuit board plies 22a, 22b, wherein a reversal structure 64 connects the input of the first circuit board ply 22a with the output of the second circuit board ply 22b. The reversal structure 64 can be used instead of a discontinuity (see FIG. 22). Alternatively, the reversal structure 64 can be formed directly by the first or second branch location (see FIG. 22) for reversing the transmission-, respectively received, signals into another circuit board ply.

Figure 24B:
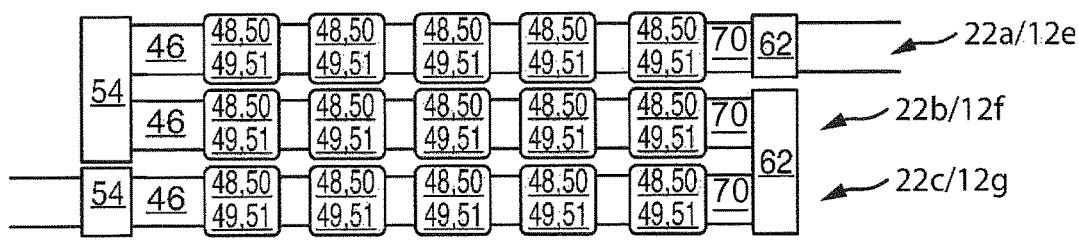
FIG. 24b is a schematic side view of three circuit board plies, each having a connecting line, wherein the connecting lines are connected pairwise with one another.

FIG. 24b shows a side view of three different circuit board plies 22a, b, c with respective connecting lines 12e, f, g, wherein the connecting lines 12e, f, g, are arranged parallel and connected pairwise at the interfaces of the respective circuit boards 22a, b, c with one another by means of first and second discontinuities 54, 62. The large vias 26 can also pass through a number of circuit board plies 22a, b, c, since these lie directly neighboring and on top of one another.

In the connecting of two connecting lines 12 together, the first discontinuity 54 of the first connecting line 12 is connected with the second discontinuity 62 of the second connecting line and the mutually connected first and second discontinuities 54, 62 utilized as reflection locations, in order to achieve multiple reflections and, thus, a greater time delay.

Figure 24C:
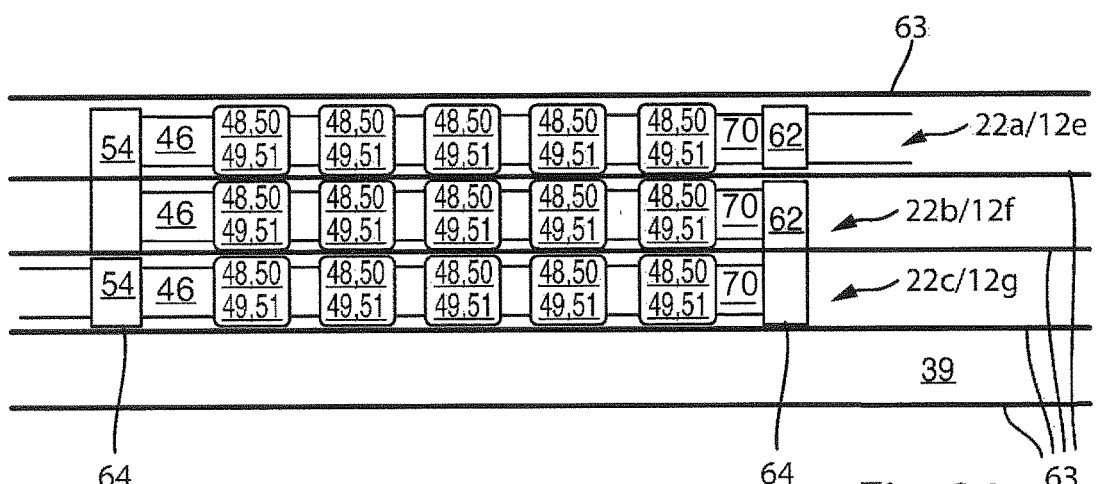
FIG. 24c is a schematic side view of three circuit board plies of FIG. 24b with, in each case, a metal track between two neighboring circuit boards.

FIG. 24c shows a side view of a circuit board arrangement with three different circuit board plies 22a, b, c of FIG. 24a, wherein, in each case, a metal track 63 is arranged between two neighboring circuit board plies 22a, b, c. The metal tracks can be shared, in each case, by two neighboring circuit board plies.

Figure 24D:
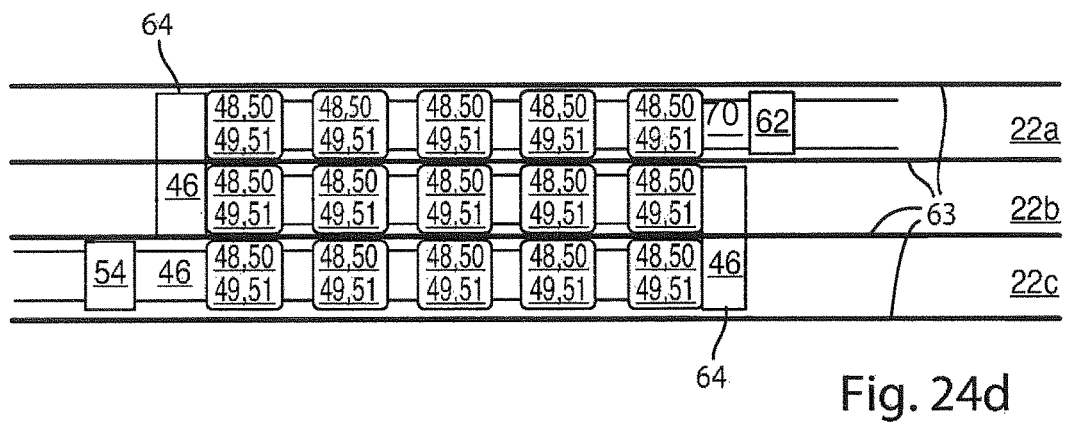
FIG. 24d is a schematic side view of three circuit boards of FIG. 24c, wherein a metal track is arranged between two neighboring circuit board plies.

FIG. 24d shows an arrangement of three circuit board plies 22a, 22b, 22c, which, corresponding to FIG. 23b, are connected with one another. Used as first and second discontinuity 54, 62 is, in each case, the adjoining circuit board with the respective delay element. In such case, the reversal structure 64 is to be given the correct length.

Figure 24E:
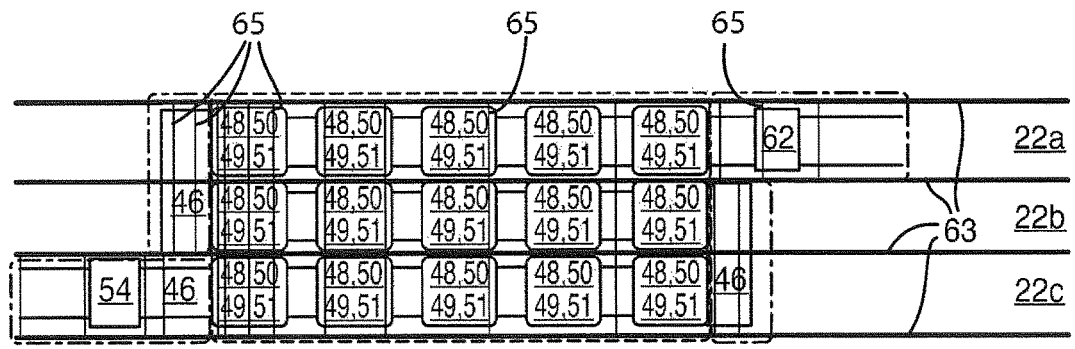
FIG. 24e is a schematic side view of three circuit boards of FIG. 24d with vias, which penetrate through all circuit boards.

FIG. 24e shows an arrangement with metallized vias 65, which pass through a plurality of, or all, circuit boards 22a, b, c. The metallized vias 65 are contactable individually from the first above lying circuit board 22a. This facilitates and favors the manufacture of such an arrangement.

Figure 25:
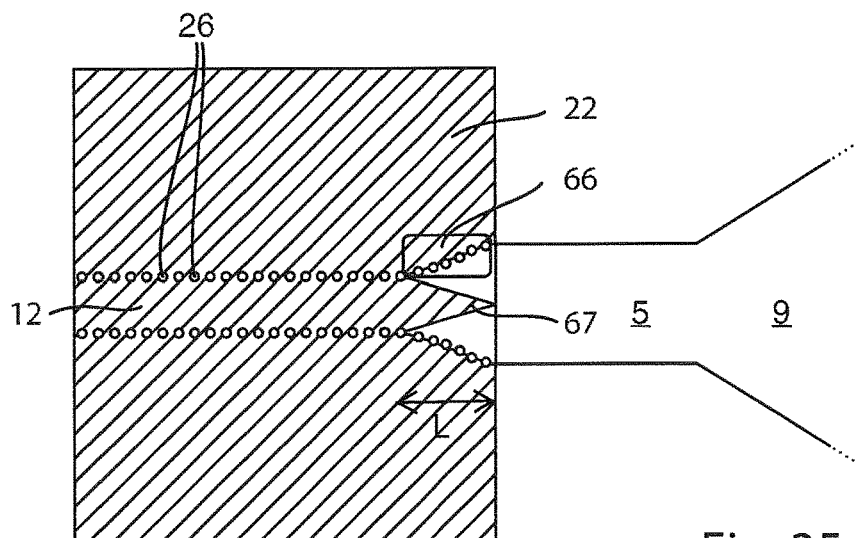
FIG. 25 is a transition between a connecting line, which is implemented on a circuit card by means of vias, and a hollow conductor of an antenna element.

FIG. 25 shows a connecting line 12, which is in communication with a hollow conductor 5 of an antenna element 2, wherein the connecting line 12 is implemented on a circuit board by means of large vias 26.

Hollow conductor 5 is in communication with a radiating element 9 of the antenna element 2. Since the circuit board 22 is embodied of a material having a relative dielectric constant (DK) greater than 1, the dimensions of the connecting line 12 are less than a connecting line 12, which is filled with vacuum (DK=1) or with air (1.0<DK<1.005).

In order to obtain a reflection free transition between the connecting line 12 and the hollow conductor 5, there must be no impedance jump at the transition. In the case of an impedance jump at the transition, analogously to the index of refraction of an optical medium, a part of the transmission-, respectively received, signals would be reflected in the opposed direction. Furthermore, the transition is mechanically continuous, in order that wave fractions are not partitioned off at the transition.

The transition is achieved by a widening 66 of the connecting line 12 to the dimensions of the hollow conductor 5. Occurring within this widening 66 in the case of uniform filling is a continuous impedance change. In order to reduce this impedance change, a conical taper 67 of the circuit board 22 is provided, which is embodied in such a manner that it compensates the impedance change of the widening 66, i.e. the transmission-, respectively received, signals, in passing through the connecting line 12 and the widening or the conical region 67, always maintain the same line impedance.

The transition between the widening 66 of the connecting line 12 and the conical region 67 must be continuous and can, for example, be embodied linearly, conically or in the shape of an exponential curve or trumpet shaped. A symmetric shape is advantageous, however, not absolutely necessary. The length L of the widening 66, respectively the conical region, amounts to a fourth or a half of the wavelength to be transferred. Depending on dimensioning, the length L of the widening 66 and the length of the conical region 67 can be different.

The invention claimed is:

1. An apparatus for determining the fill level of a fill substance in a container, comprising:
at least one antenna element for sending electromagnetic transmission signals toward the fill substance and for receiving received signals reflected on the surface of the fill substance, said at least one antenna element has a hollow conductor, wherein there is arranged at a first end region of said hollow conductor a coupling element for out-coupling transmission signals and for in-coupling received signals, wherein there is arranged at a second end region of said hollow conductor a radiating element directed toward the fill substance;
a transmitting/receiving unit having a signal generator for producing the transmission signals;
a connecting line, which leads the transmission signals from said transmitting/receiving unit to said coupling element and the received signals from said coupling element to said transmitting/receiving unit; and
a circuit board, wherein:
said transmitting/receiving unit determines the fill level of the fill substance in the container based on travel time of the transmission signals and the received signals;
said connecting line and/or said hollow conductor are/is embodied in such a way that the transmission signals and/or the received signals are transferred time delayed, so that the distance between said at least one antenna element and the surface of the fill substance is virtually increased and the received signal is isolated in time from disturbances of said transmitting/receiving unit, which arise in the case of producing the transmission signals;
a first side of said circuit board has at least partially a first conductive layer and a second side of said circuit board has at least partially a second conductive layer;
said circuit board has vias, which electrically connect said first conductive layer with said second conductive layer; and
the vias are arranged in such a way that a first row and a second row of vias are present, so that said connecting line is bounded by said first and said second sides of said circuit board and by said first and said second rows of vias.

2. The apparatus as claimed in claim 1, wherein:
said connecting line includes a chain antenna, so that the transmission signals and/or received signals are transferred via said chain antenna and are time delayed by means of said chain antenna; and said chain antenna is preferably operated with frequencies far below its limit frequency.

3. The apparatus as claimed in claim 1, wherein:
said hollow conductor hollow conductor extension is embodied siphon like and/or helix like.

4. The apparatus as claimed in claim 1, further comprising:
a circuit board which includes a first circuit board ply and a second circuit board ply, wherein:
said coupling element is arranged on said first circuit board ply and said transmitting/receiving separator on said second circuit board ply;
there is arranged on said first circuit board ply a first portion of said connecting line, which is connected with a first end of said coupling element;
there is arranged on said second circuit board ply a second portion of said connecting line, which is connected with a first end of said transmitting/receiving separator; and
said circuit board has at least one via, which connects a second end of said first portion of said connecting line with a second end of said second portion of said connecting line, so that the transmission signal and/or the received signal must travel through said first and said second portions of said connecting line.

5. The apparatus as claimed in claim 1, further comprising: a circuit board, wherein:
said connecting line is embodied as a microstrip transmission line on said circuit board; and
said circuit board has at least one shielding line, in order to shield transmission signals, respectively received signals, radiated from said connecting line.

6. The apparatus as claimed in claim 5, wherein:
said at least one shielding line has ground potential.

7. The apparatus as claimed in claim 5, wherein:
the said circuit board includes on a side lying opposite said connecting line a metal surface, which has ground potential; and
said at least one shielding line is connected with said metal surface by means of at least one via.

8. The apparatus as claimed in claim 5, wherein:
said shielding line includes a sawtooth shaped structure on an edge region facing said connecting line, in order to absorb transmission signals, respectively received signals, radiated from said connecting line.

9. The apparatus as claimed in claim 1, further comprising:
a circuit board which includes a circularly shaped metal ring, which surrounds said connecting line; and
said metal ring has on an edge region facing said connecting line a sawtooth shaped structure, in order to absorb transmission signals, respectively received signals radiated from said connecting line.

10. The apparatus as claimed in claim 9, wherein:
said circuit board includes at least one connecting element, which connects said metal ring with said shielding line, in order to reduce axially traveling transmission signals, respectively received signals.

11. The apparatus as claimed in claim 1, wherein:
the separation of two neighboring vias in said first and/or said second row is less than a fourth, preferably less than an eighth, of the wavelength of the transmission signals, respectively received signals.

12. The apparatus as claimed in claim 1, wherein:
said first and said second rows of the vias in said circuit board resemble a chain antenna.

13. The apparatus as claimed in claim 12, wherein:
said chain antenna resembling, connecting line includes perpendicular and parallel portions, which are perpendicular, respectively parallel, to the transfer direction of said connecting line; and
a transition between a perpendicular and a parallel portion is reinforced by means of a supplemental series of vias.

14. The apparatus as claimed in claim 1, wherein:
at least two, preferably three, circuit boards are arranged neighboring one another; and
said two, preferably three, circuit boards are connected pairwise with one another, so that the transmission signals, respectively received signals, pass through all circuit boards once.

15. The apparatus as claimed in claim 14, wherein:
said at least two, preferably three, circuit boards are stacked on top of one another; and
said at least two, preferably three, circuit boards have at least one shared via, which goes through all circuit boards.

16. The apparatus as claimed in claim 1, wherein:
a supply line and/or a drain line of said connecting line have/has a diameter discontinuity, in order to produce reflected portions of the transmission signals and/or the received signals.

17. The apparatus as claimed in claim 1, wherein:
a supply line and/or a drain line of said connecting line includes a discontinuity in the form of a connecting line neighboring said supply line and/or said drain line.

18. The apparatus as claimed in claim 1, wherein:
said connecting line at an opening to said hollow conductor of said antenna element has a widening to the diameter of said hollow conductor, in order that the impedance jump at the transition between said connecting line and said hollow conductor is as small as possible and the geometric fit is as continuous as possible.

19. The apparatus as claimed in claim 18, wherein:
said circuit board in the region of said widening has a conical taper toward said hollow conductor.

* * * * *